(12) United States Patent
Baratta et al.

(10) Patent No.: US 7,487,576 B2
(45) Date of Patent: Feb. 10, 2009

(54) COMPOSITE TRACK, COLUMN AND OTHER SUPPORTS, INCLUDING FOR MACHINERY

(75) Inventors: Anthony Baratta, Oak Park, CA (US); Luciano Cuevas, Sylmar, CA (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 518 days.

(21) Appl. No.: 11/036,974

(22) Filed: Jan. 15, 2005

(65) Prior Publication Data

US 2005/0214084 A1  Sep. 29, 2005

Related U.S. Application Data

(63) Continuation-in-part of application No. 10/358,072, filed on Feb. 3, 2003, now Pat. No. 7,214,007.

(51) Int. Cl.
*B23B 47/00* (2006.01)
(52) U.S. Cl. .............. 29/26 A; 408/111; 408/135; 408/234; 248/651; 248/676; 248/678; 409/235; 52/793.1; 83/745; 175/220; 428/178; 428/188
(58) Field of Classification Search ......... 408/110–111, 408/135, 136, 234; 29/26 A; 248/637, 651, 248/656, 674, 678–679, 676; 156/429; 409/235; 52/793.1; 83/745; 175/220; 173/141, 148; 428/178, 188

See application file for complete search history.

(56) References Cited

U.S. PATENT DOCUMENTS

| | | | |
|---|---|---|---|
| 1,395,194 A * | 10/1921 | Lindhe | 408/92 |
| 2,261,746 A | 11/1941 | Seaboly | |
| 2,642,761 A | 6/1953 | Goldberg | |
| 3,412,813 A | 11/1968 | Johnson | |
| 3,464,655 A * | 9/1969 | Schuman | 248/651 |
| 3,800,636 A | 4/1974 | Zagar | |
| 4,320,887 A | 3/1982 | Destree | |
| 4,468,159 A * | 8/1984 | Oster | 408/56 |
| 4,522,098 A | 6/1985 | Bliss | |
| 4,684,303 A * | 8/1987 | Erdt et al. | 409/235 |
| 4,826,127 A | 5/1989 | Koblischek et al. | |
| 5,118,555 A | 6/1992 | Horovitz | |
| 5,183,374 A | 2/1993 | Line | |

(Continued)

FOREIGN PATENT DOCUMENTS

DE  1925208 B  2/1978

(Continued)

OTHER PUBLICATIONS

Dimas, Instruction Manual Drill Stand Model 42N, Operation, Maintenance, Parts; 1994.

*Primary Examiner*—Daniel W Howell
(74) *Attorney, Agent, or Firm*—Henricks, Slavin & Holmes LLP

(57) ABSTRACT

A drill assembly, for example for drilling or coring concrete, has a drill column formed from a composite material. A track for a wall saw or for supporting other structures for movement along the track is formed from a composite material. A composite column, rail or other longitudinally extending composite structure having a hollow interior portion includes an internal support structure.

47 Claims, 20 Drawing Sheets

U.S. PATENT DOCUMENTS

| | | | |
|---|---|---|---|
| 5,799,924 A | 9/1998 | Slocum et al. | |
| 6,309,148 B1 * | 10/2001 | Wang | 408/87 |
| 6,519,823 B1 | 2/2003 | Sugata et al. | |
| 6,955,167 B2 * | 10/2005 | Baratta | 125/21 |
| 7,018,279 B2 * | 3/2006 | Baratta | 451/344 |
| 7,214,007 B2 | 5/2007 | Baratta | |
| 2003/0096096 A1 | 5/2003 | Jo et al. | |
| 2004/0009338 A1 | 1/2004 | Jo et al. | |
| 2004/0151552 A1 | 8/2004 | Baratta et al. | |
| 2005/0061128 A1 | 3/2005 | Caughlin et al. | |

FOREIGN PATENT DOCUMENTS

| | | |
|---|---|---|
| DE | 3408457 A1 | 9/1985 |
| DE | 3532995 A1 | 3/1987 |
| DE | 10064173 C1 | 6/2002 |
| GB | 2095143 A | 9/1982 |
| JP | 58102638 A | 6/1983 |
| JP | 59124533 A | 7/1984 |
| JP | 08224726 A | 9/1996 |
| JP | 09123158 A | 5/1997 |
| JP | 09300115 A | 11/1997 |
| JP | 2002301608 A * | 10/2002 |

* cited by examiner

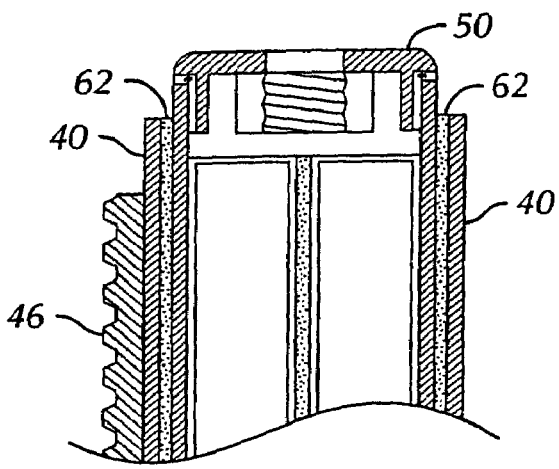
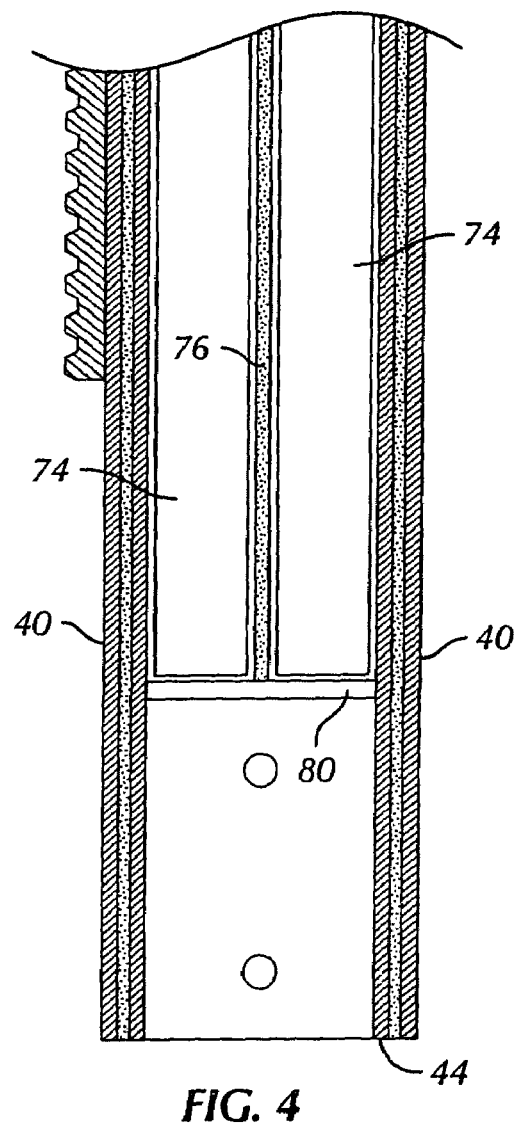
FIG. 4

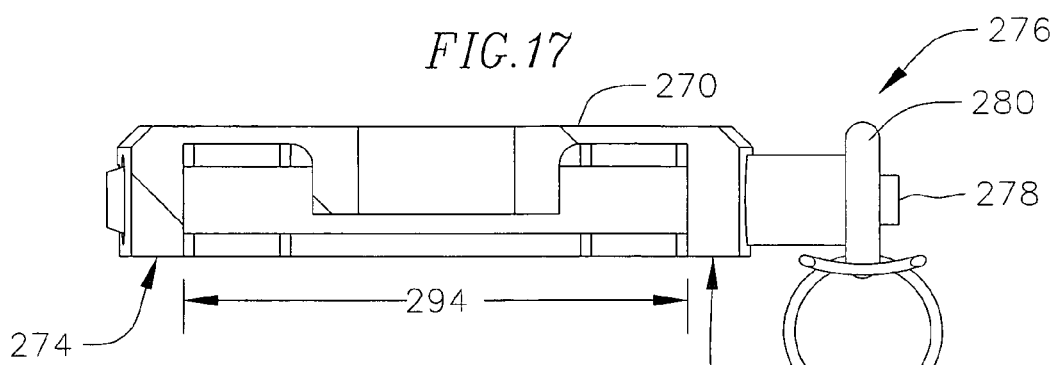
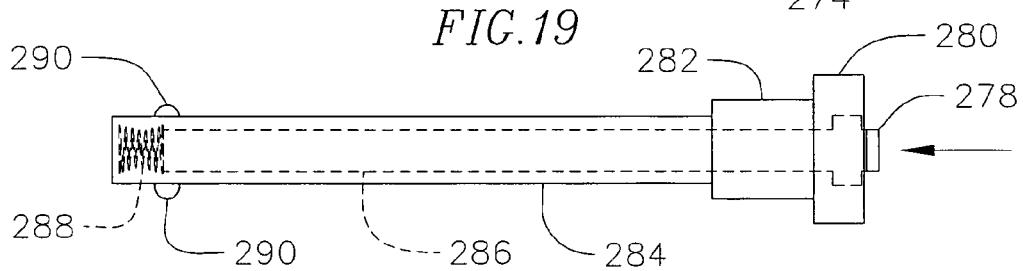
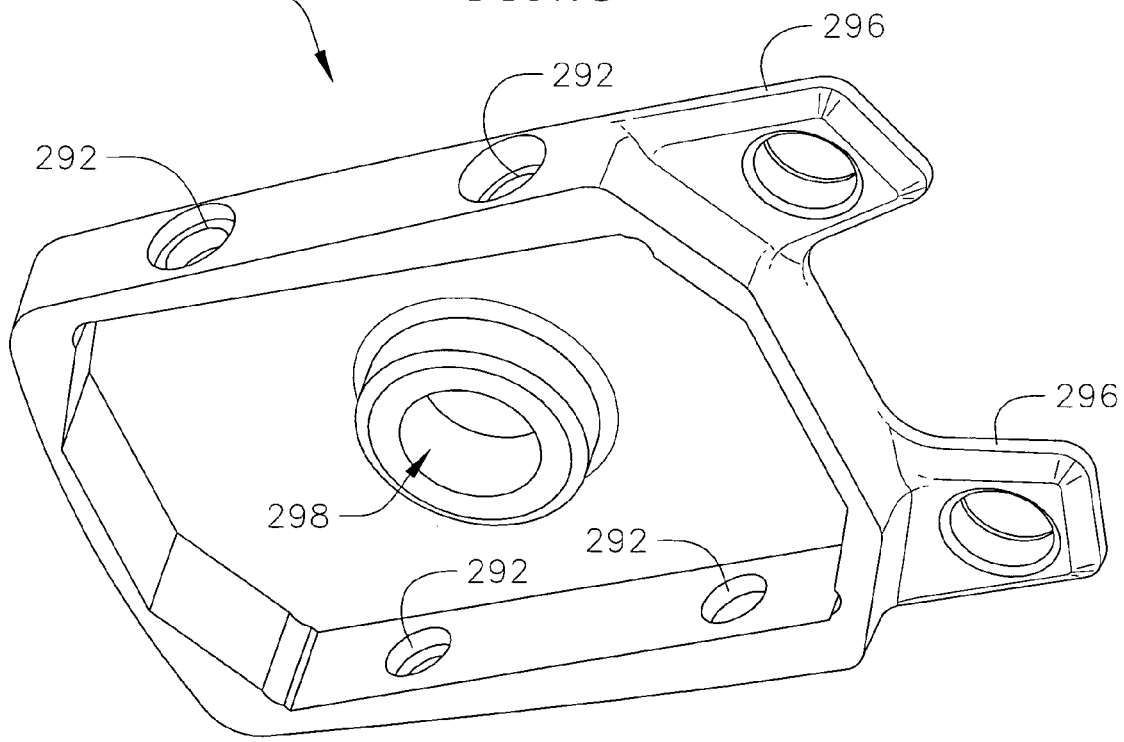

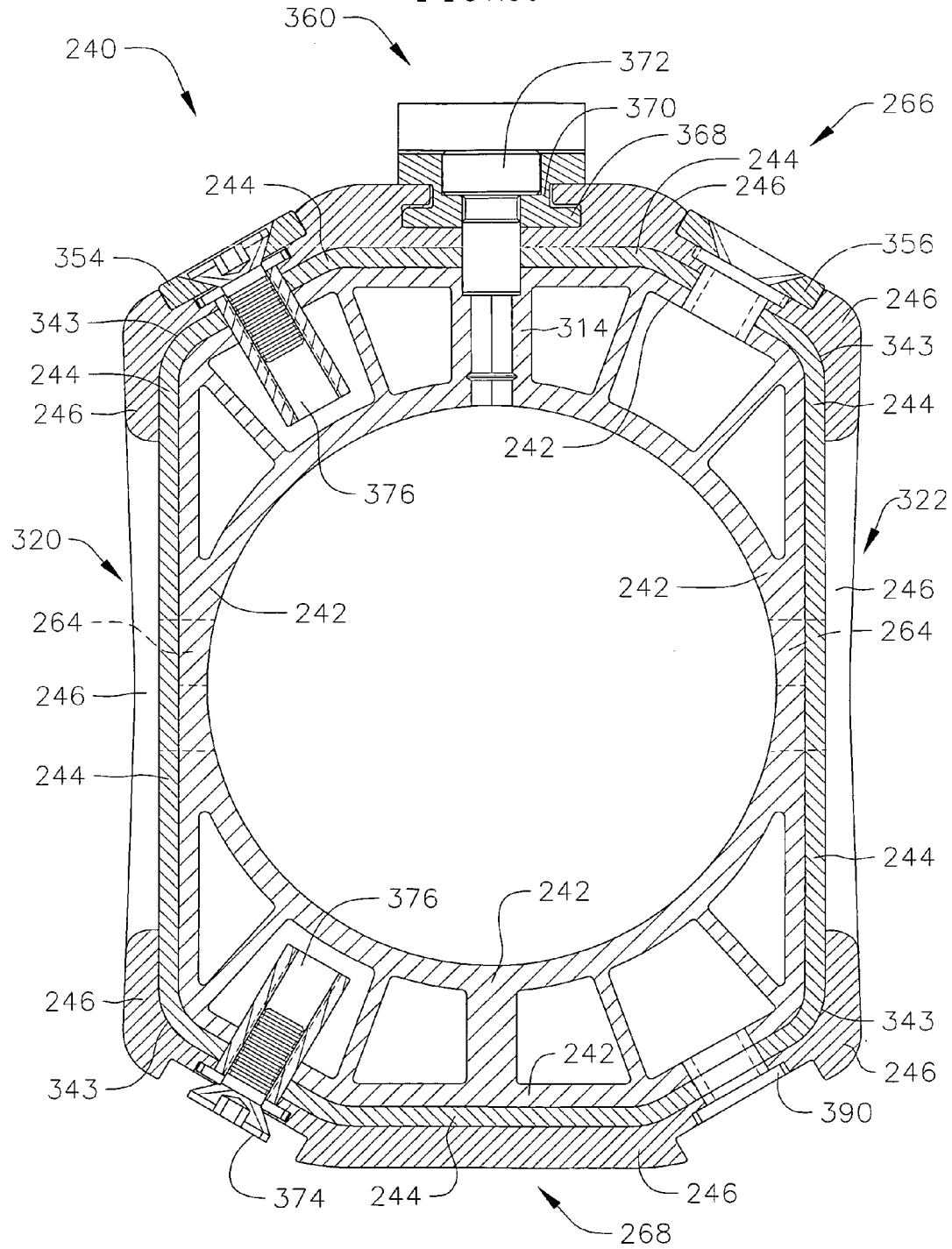

COMPOSITE TRACK, COLUMN AND OTHER SUPPORTS, INCLUDING FOR MACHINERY

CROSS REFERENCE TO RELATED APPLICATIONS

This is a continuation-in-part of Ser. No. 10/358,072 filed Feb. 3, 2003, now U.S. Pat. No. 7,214,007 the specification and drawings of which are incorporated herein by reference.

BACKGROUND

1. Field of the Inventions

The present disclosure relates to machining equipment, including that used on concrete, masonry and other materials, and including drill assemblies, wall saws, and flat saws. The present disclosure also relates to composite structures.

2. Related Art

Equipment used to machine work pieces, including movable and individual work pieces as well as fixed surfaces or structures, are generally strong and durable to ensure precise and accurate machining of the work piece. Often, the equipment is relatively heavy to ensure that the equipment does not move during operation, thereby helping to assure precision and accuracy. Where the work piece is a fixed surface or structure, in other words immovable, which is typically the case for concrete structures, the equipment is transported to the work piece and setup for operating on work piece.

Portable machining equipment is often formed from steel and other components that have high strength, durability and resistance to large loads and stresses. These steel and other components add significant weight to the equipment, and they are often broken down into pieces or sub-components and carried separately to job sites. They are then re-assembled for use and then broken down again to be removed from the job site.

SUMMARY

Components and equipment used for machining work pieces are made lighter with composite materials. Such components may include columns, tracks, rails and other structures previously made from steel and other metals. Components made from composite materials may be strengthened by providing inserts.

In one example disclosed herein, a drill assembly includes a support base and a drill column supported by the base wherein the drill column is formed from a composite material. In one example, the composite material includes carbon fibers, and in another example the composite material includes glass fibers. In one form, the composite material is formed principally from carbon fibers with glass fibers exterior to the carbon fibers.

In a drill assembly that includes a support base and a composite drill column, one or more plates are included on the outside of the drill column. The plate may be a steel plate, and may be bonded to the outside of the column. Steel plates may be used as bearing surfaces for supporting one or more rollers on a housing that travels along the column. A plate may also include an engagement surface such as a rack.

In a drill assembly that includes a composite drill column, the drill column may have a rectangular cross-section and a hollow interior portion containing a supporting insert. The insert may be foam, such as a closed-cell foam, a honey comb material formed from a polymeric substance or a metal, plastic or composite structure, for example a carbon fiber and/or glass fiber composite. A composite insert may have the same shape as the outer shape of the drill column or a different shape, and may have the same shape as the hollow interior portion or a different shape. In one example, the drill column has a rectangular cross-sectional shape and an insert has the same shape. The rectangular insert can contact the interior wall of the drill column over a substantial surface of the facing wall or walls of the insert, or over a small surface. For example, the entire surface of one side of the insert can contact the adjacent surface of the drill column. In another example, a corner surface of the insert can contact the adjacent surface of the drill column. In a further example, a plurality of inserts may be positioned within the hollow portion of the drill column in such a way that substantially all of the hollow surface is contacted by an adjacent surface of insert. In a square drill column having a square hollow interior, four smaller square inserts can occupy the entire hollow interior, with each insert having a wall contacting the adjacent wall of the column, such as through an appropriate bonding agent, glue or other adhesive. Additionally, in a square drill column having a square hollow interior, a circular insert touches adjacent walls of a hollow interior surface at four tangent points, or a square insert can touch each of its four corners to mid points of the adjacent column walls.

In another example of a composite material being used with equipment for working on a work piece, a track for a wall saw has a rail formed from a carbon fiber composite with a hollow portion and a support structure extending within the hollow portion. In one example, a wall of the support structure contacts a wall of the hollow portion, and may be bonded to the wall of the hollow portion through an adhesive, glue or other bonding material. One or more plates may be placed on respective surfaces of the rail, and a rack or other engagement structure may also be placed on the rail.

In an example of a track or rail for a wall saw or other piece of equipment, the track may have a first shape and the insert may have the same shape or a different shape. The insert can be a foam, honey comb material or a composite structure, for example a carbon fiber and/or glass fiber composite. The composite insert may have the same shape has the track or a different shape, and in one example, the track has a hollow rectangular cross-section and the structural support is also rectangular. The rectangular support can contact the interior wall of the track over a substantial surface of the facing wall or walls of the rectangular support, or over a small surface. A plurality of supports may be positioned within the hollow portion, and may be configured so that substantially all of the hollow surface is contacted by an adjacent surface of the support. A circular support structure may contact adjacent walls of the hollow interior surface, for example at four tangent points, or a square support structure can touch each of its four corners to mid points of the adjacent track walls. Other configurations are possible.

A composite structure for supporting other structures includes a first fiber reinforced structure having a hollow interior portion and a second structure extending within the hollow portion. The second structure contacts an inside surface of the hollow interior portion. In one example, the second structure may also be a composite, such as a fiber reinforced structure. In another example, the second structure contacts the inside surface of the hollow portion at a point adjacent an outside surface of the first structure against which a force or load is applied, such as through a bearing, load member or other means. Where a load is applied to the outside surface, a bearing plate or other bearing surface may be applied to the first structure to help support the load. The first and second supports may have the same shape or different shapes, and in one example, the first support is a hollow rectangular structure and the second support is also rectangular, and preferably hollow. The rectangular second support can contact the interior wall of the rectangular first support over a substantial surface of the facing wall or walls of the second rectangular support, or over a small surface. A plurality of second supports may be positioned within the hollow portion of the first support, and may be configured so that substantially all of the hollow surface is contacted by respective adjacent surfaces of the second supports. The second support may be circular and may contact the hollow interior surface of the first support, for example at four tangent points, or it may be a square support structure contacting the interior portion of hollow surface at its four corners to mid points of the adjacent walls of the first support.

A longitudinally extending element includes a core element, a composite fiber material extending over at least a portion of the core element and a second material extending over at least a portion of the composite. The core element may be formed from a composite material, a metal, plastic or other materials, and the composite fiber may include carbon, fiberglass or other fiber materials. The longitudinally extending element may be straight, and may be used as a drill column. When used as a drill column, means may be provided on the second material for supporting a carriage for movement along the column, and the carriage may support a drill or similar equipment.

In another example, a longitudinally extending element includes a core element, and oriented fiber composite material and a second material extending over at least a portion of the composite. The fiber orientation may occur in layers, and one layer may have fibers oriented close to 0 degrees (such as between 0 and 10 or 15 degrees) relative to a longitudinal axis of the longitudinally extending element. Other layers may have the same or similar orientation, for example 0 to 10 or 20 degrees, or may be at other angles such as 30, 40, 45 degrees or other angles.

A further example has a longitudinally extending element with a core element, a fiber composite material and a second material extending over at least a portion of the composite. The composite is preferably under compression. In one example, the composite is under compression by press fitting within the second material where there is no gap or there is a negative gap between the second material and composite. In another example, the composite is under compression through application of fasteners between the second material and the core element.

An additional example has a longitudinally extending element with a core element, a fiber composite material and a second material and wherein additional materials are incorporated in or added to the second material. Additional materials may include wear strips, for example those that may be press fit into grooves in the second material, a rack press fit into a groove in the second material, as well as other materials. The additional materials may be a removable so they can the replaced. The materials may also be fixed in place.

A longitudinally extending element may be produced by winding fibers around a first longitudinally extending element and curing a composite of the fibers and a curable compound. A second element may be placed around the composite. The second element may be placed around the composite by press fitting the second element over at least a part of the composite. The second element and the composite may be configured so as to have zero gap between them in their relaxed states, or a negative gap. Alternatively, the second element and the composite may be configured so that the outer envelope of the composite may be slightly larger than an inner envelope defined by the second element. Pressure may be applied before the second element can be placed around the composite.

These and other aspects will be considered in more detail in conjunction with the drawings, a brief description of which follows, and the detailed description.

BRIEF DESCRIPTION OF THE DRAWINGS

FIG. 4 is a longitudinal cross-section of the drill column of FIG. 3 taken long lines 4-4 of FIG. 2.

FIG. 17 is a transverse vertical section of a cap that can be used with the drill column of FIG. 14.

FIG. 18 is a lower isometric view of the cap of FIG. 17.

FIG. 19 is a schematic view of a releasable securement for securing the cap to a drill column.

FIG. 20 is a transverse horizontal section of the drill column of FIG. 14.

DETAILED DESCRIPTION

Figure 1:
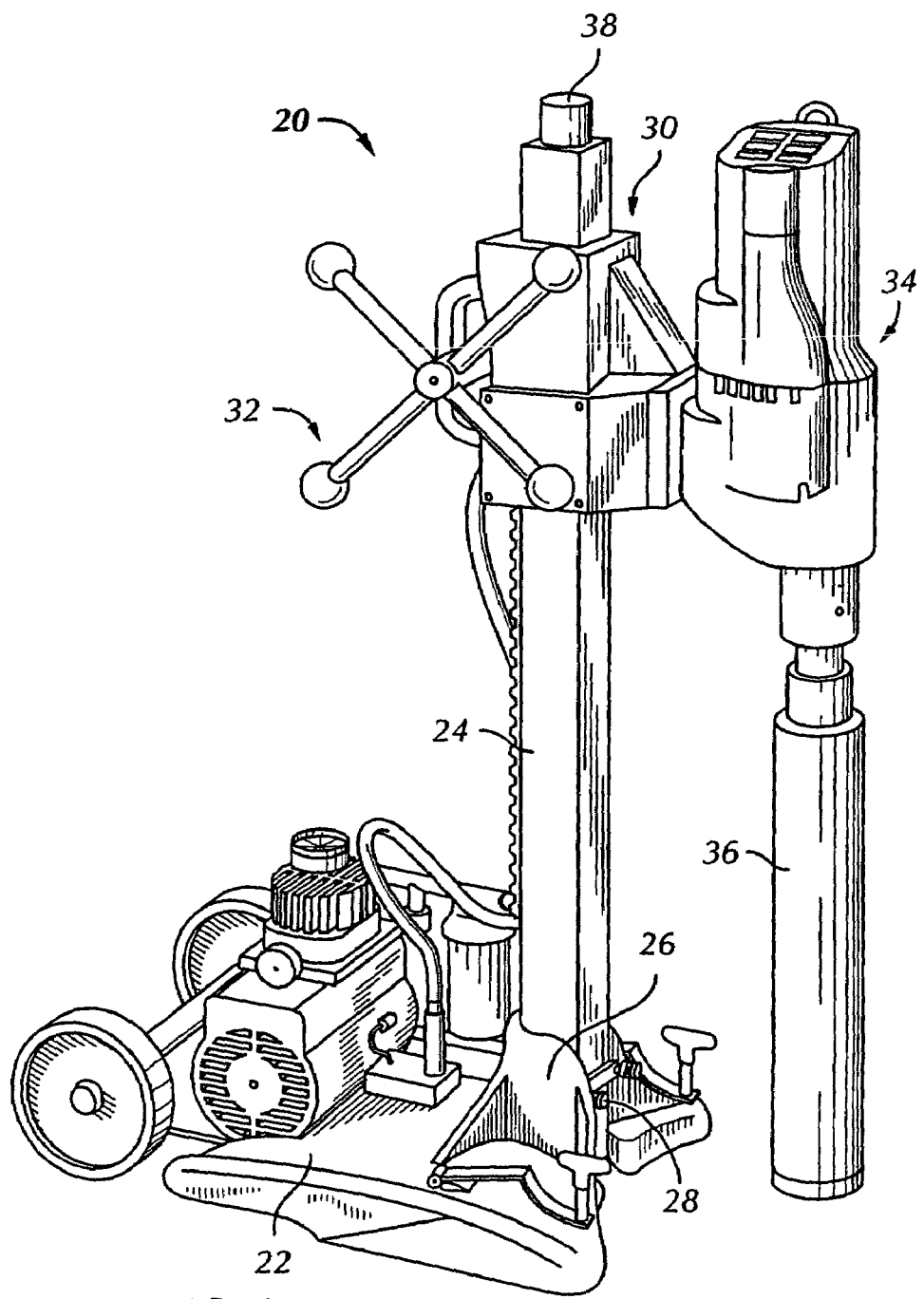
FIG. 1 is an isometric view of a machining device in the form of a concrete drill with which a composite column can be used.

The following specification taken in conjunction with the drawings sets forth the examples of the present inventions in such a manner that any person skilled in the art can make and use the inventions. The examples of the inventions disclosed herein are the best modes contemplated by the inventor for carrying out the inventions in a commercial environment, although it should be understood that various modifications can be accomplished within the parameters of the present inventions.

The descriptions herein are directed to several examples of machining devices, as well as to examples of composite structures for supporting devices. The examples include a drill column for a concrete drill and a track for a wall saw, as well as examples of composite structures used as columns and rails, but one or more aspects of these examples can be incorporated into other apparatus and designs.

In one example of a machining device (FIG. 1), a concrete drill 20 includes a support base 22 for accepting or receiving a drill column 24 in a mounting bracket 26. One or more bolts 28 secure the drill column within the mounting bracket 26 in a manner conventional with the drill stands such as that shown in FIG. 1. A drill support in the form of a carriage 30 extends about the drill column and moves along the drill column through rotation of the handle 32. The carriage supports a drill motor 34, which drives a bit or coring device 36. A jack screw 38 is threaded into the top of the drill column 24, to allow bracing of the drill column against an overhead support, such as a beam, ceiling or other structure, possibly through one or more spacers (not shown).

Figure 2:
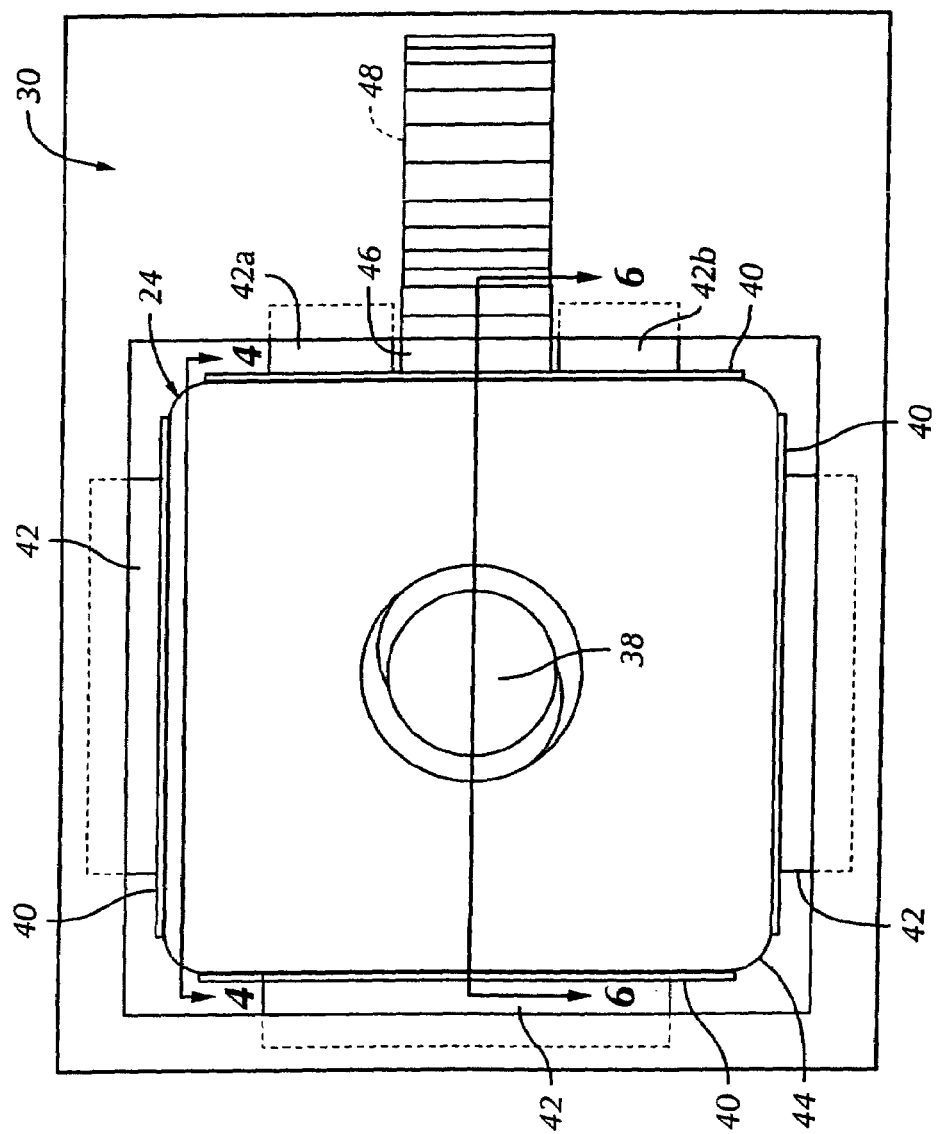
FIG. 2 is a top plan view of the composite column and part of a housing used for carrying a drill such as that shown in FIG. 1.
Figure 3:
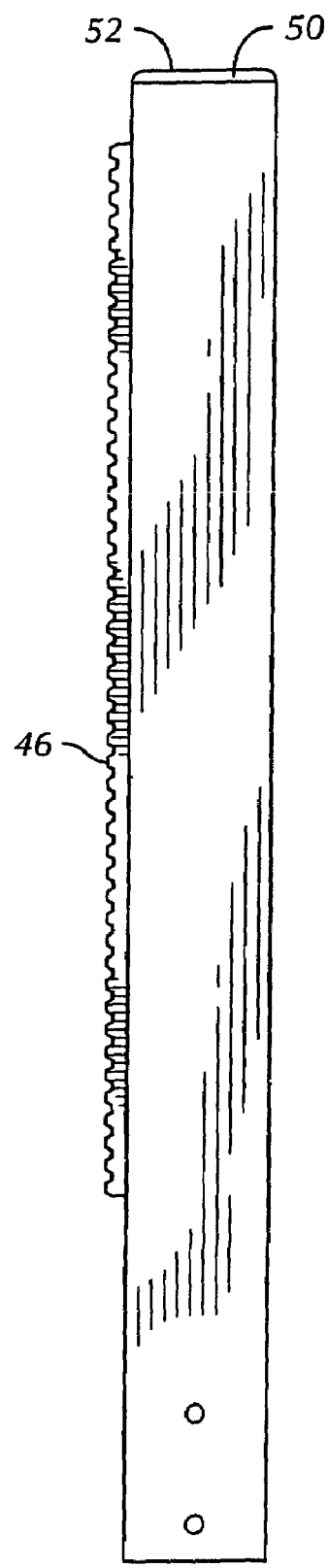
FIG. 3 is a side elevation view of the column of FIG. 1.

The column 24 includes one or more surfaces or plates in the form of bearing plates 40 (FIG. 2) for receiving and distributing loads applied to the column through the carriage 30, for example through bearings or rollers 42 housed within the carriage 30. The rollers are preferably elongated, and there are two upper rollers and two lower rollers on each side. Alternatively, where space permits, a single roller can be used, extending over half the width of the column. A set of rollers is placed at the upper portion of the carriage 30 and another set is placed at the lower portion of the carriage 30. One pair of rollers on one side may be replaced by an eccentric roller allowing for adjustment over time to accommodate for wear, and a pair of rollers on an adjacent side may also be replaced by an eccentric roller, to allow for adjustment on two sides.

The plates 40 also help to accommodate and distribute loads in the column through the base 22 as result of the coring or drilling operation. The plates may be approximately 0.018 inch thick stainless-steel, or other material having a suitable strength and thickness, and the thickness and width of a given plate may be somewhat inversely proportional to the width of a roller. The plates 40 are preferably bonded, adhered or otherwise fixed to a cylindrical column 44 through appropriate glue or adhesive, for example an epoxy. Each preferably extends the entire length of the cylindrical column 44 and the width of the respective face of the cylindrical column 44, terminating in the example shown in FIG. 2 before the curve in each side of the cylindrical column, for example allowing a half-inch radius at the corner. One of the bearing plates supports a rack 46 fixed, bonded, welded or otherwise securely supported on the bearing plates to allow the carriage 30 to move along the column through a gear 48 turning with the handle 32. The gear 48 may be a worm gear to more reliably control the position of the carriage 30 on the drill column 24. The carriage is supported on each side of the rack 46 through smaller bearings 42A and 42B.

A top end plate 50 (FIGS. 3-7) closes the top end of the cylindrical column 44. The top end plate 50 transmits any axial loading from the jack screw 38 longitudinally along the cylindrical column 44. The top end plate includes a top surface 52 extending transversely to a rim or ledge 54, the underside of which bears against the end face of the cylindrical column 44. An axially extending wall 56 is position inward under the rim 54 to closely fit within the opening of the cylindrical column 44. The top end plate may be formed from steel or other strong metal capable of withstanding the axial loads applied through the jack screw 38. A nut 58 is welded to the underside of the top end plate 50 for threading the jack screw 38. The top end plate 50 is secured in the end of the cylindrical column 44 through a layer of glue or other bonding agent, for example epoxy, shown schematically at 60 in FIG. 5. The layer of glue 60 is applied between the circumferential surface of the wall 56 and the corresponding internal surface of the cylindrical column 44.

Figure 5:
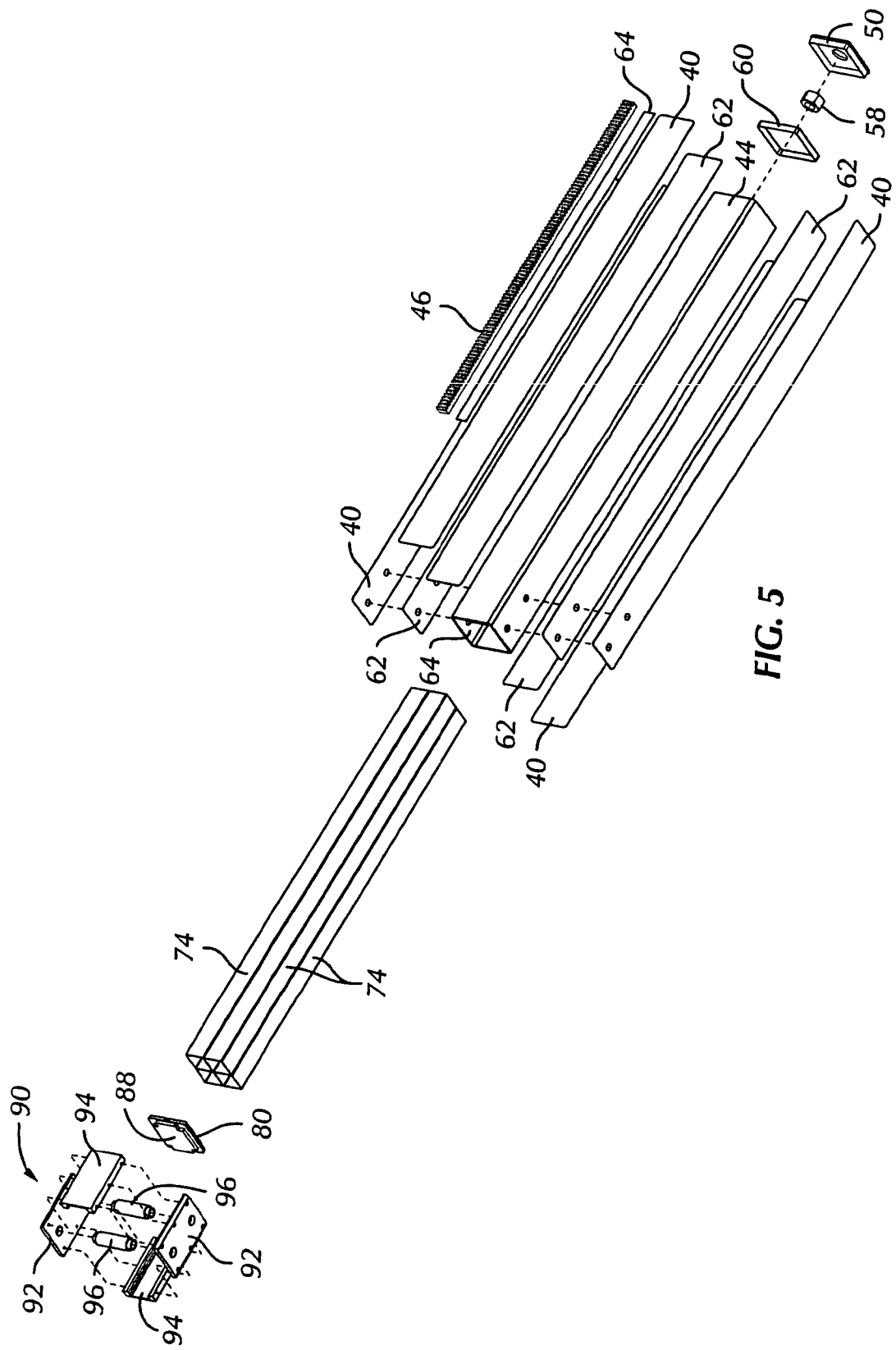
FIG. 5 is an exploded view of most of the components of the drill column of FIG. 1.
Figure 6:
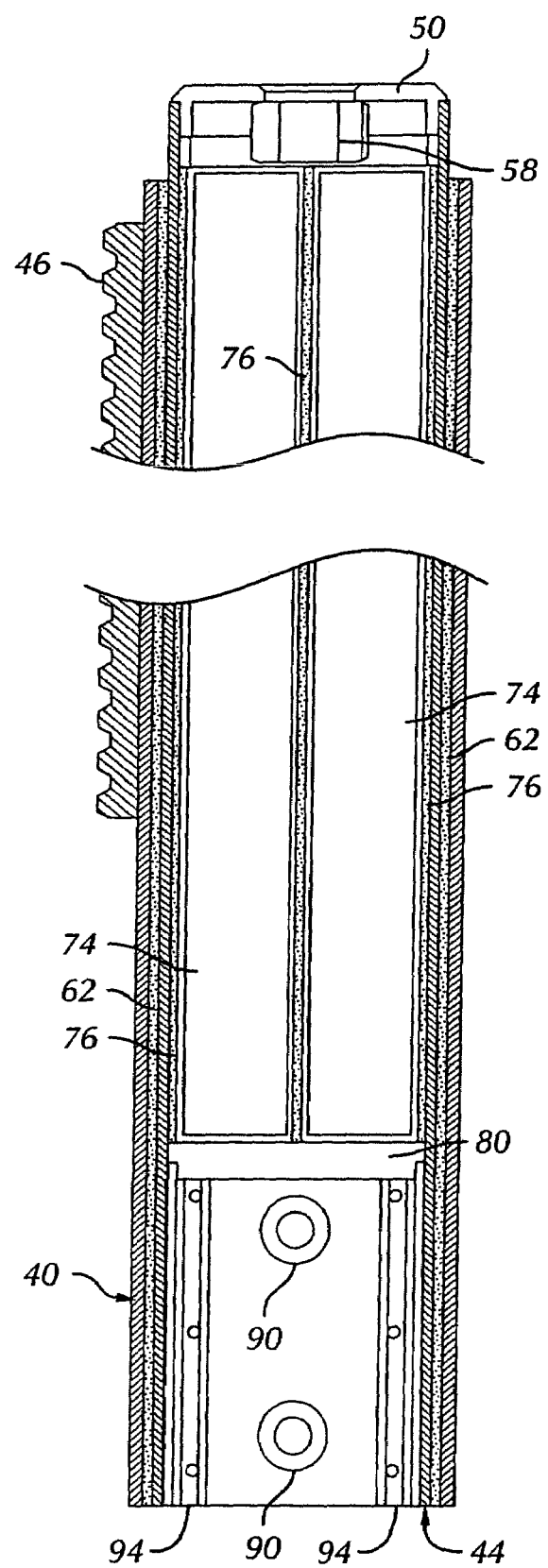
FIG. 6 is a longitudinal cross-section of the drill column of FIG. 3 similar to that of FIG. 4 but taken along the central longitudinal axis of drill column, along lines 6-6 of FIG. 2 (adhesive layers not shown).
Figure 7:
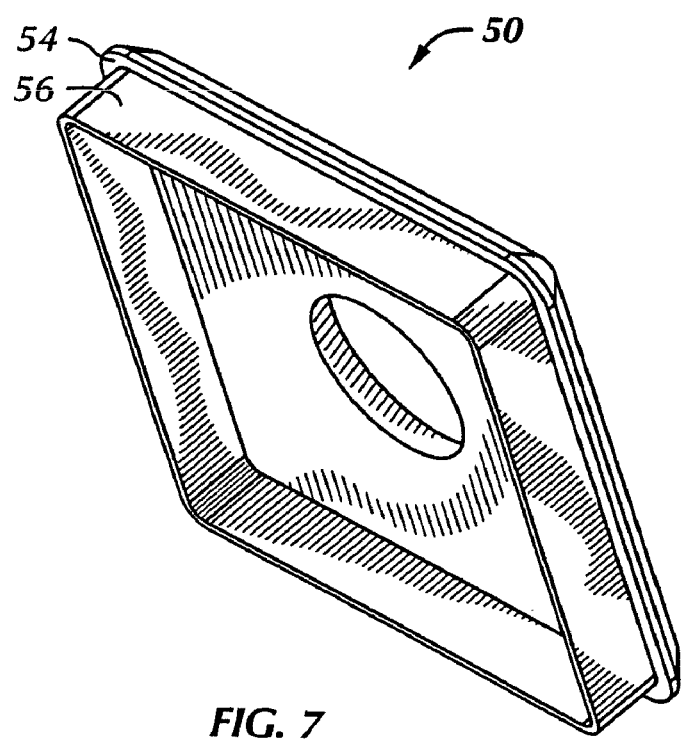
FIG. 7 is a lower isometric view of a top cap for use with the drill column of FIG. 1.

Considering the drill column 24 in more detail with respect to FIGS. 4-6, the plates 40 are preferably steel plates bonded through respective epoxy layers 62 to the underlying outer surfaces of the cylindrical column 44. For a cylindrical column supporting the carriage 30 having rollers 42 around all four sides, the cylindrical column includes a steel plate on each of the four sides of the column fixed in place by respective epoxy layers 62. A bonding layer 64 is shown in FIG. 5 for fixing the rack 46 to the underlying steel plate 40.

The cylindrical column 44 is formed as a composite of carbon fiber within a resin matrix, wherein the carbon fibers are wound at selected angles with multiple layers of pre-impregnated carbon filaments. The fiber orientation is selected according to desired criteria for withstanding possible torsion, bending or compression loads that may occur in the device. The number of windings may vary, but the present example uses about 12 layers, some of which are oriented at about 45 degrees for withstanding torsion, zero degrees for compression and 0-10 degrees for bending or stiffness. The composite column 44 is made in a manner conventional for facilities that manufacture components of composite materials. One example of companies making composite materials is Composite Tek, of Boulder, Colo., and possible techniques and configurations for components describe herein can be found in their Composites Design Guide, Revision 2, incorporated herein by reference. A layer of glass fibers is also incorporated on the outside of the carbon fiber layers to insulate the carbon fiber layers from expansion and contraction that may occur in the steel plates, and also to protect against galvanic action. The composite column has a low moment of inertia, and can replace conventional steel columns. The composite column can have thinner walls for similar loads, and has significantly lighter weight.

Figure 11:
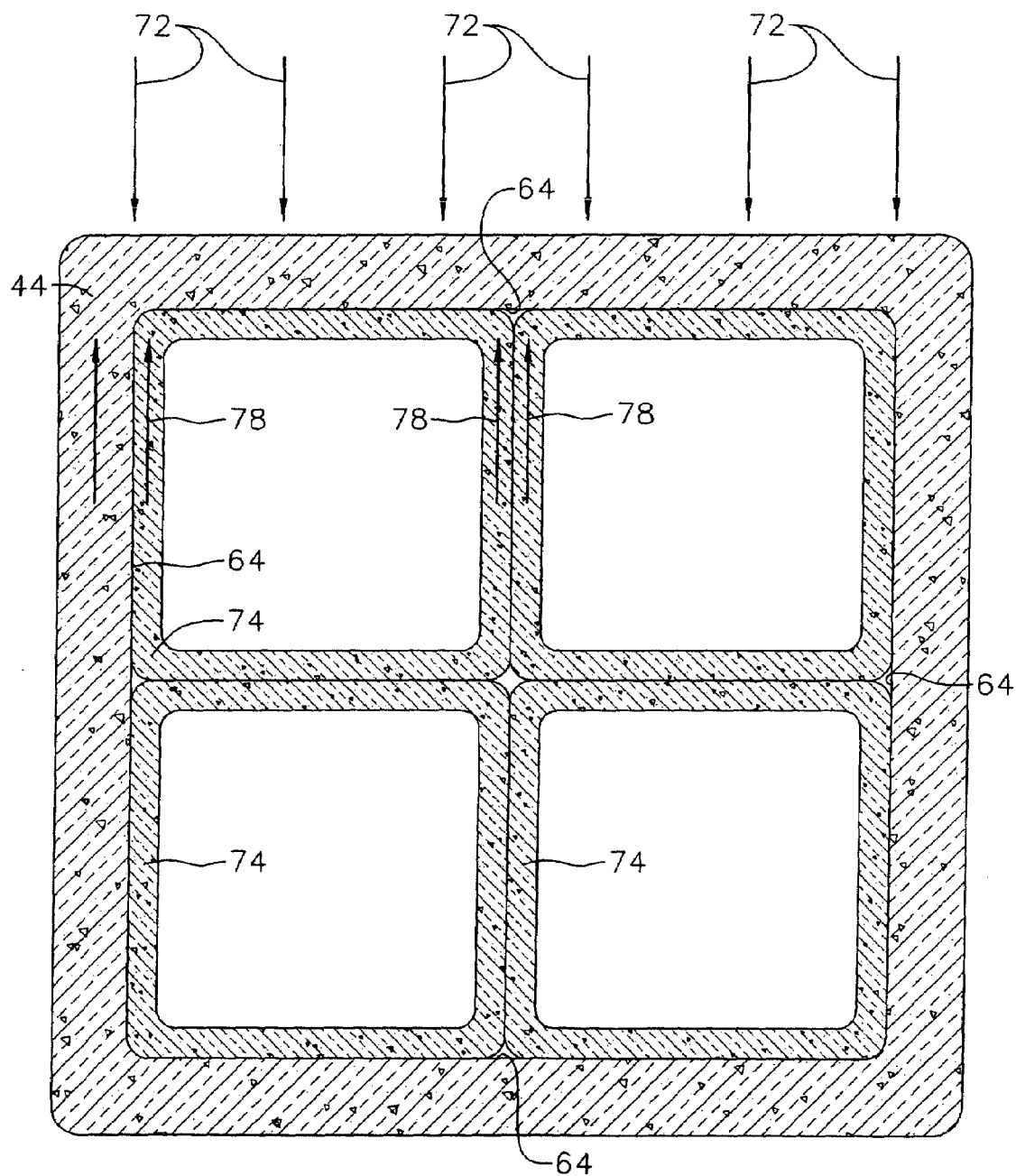
FIG. 11 is a transverse cross-section of a hollow device support having internal support structures.

A hollow composite structure can be strengthened by including one or more inserts in contact with an interior wall of the hollow structure. The insert can be formed from the same material as the composite structure or from a different material, for example a closed cell foam or a honeycomb plastic. The insert can be formed with the same shape or a different shape than the composite structure, and may take for example the shapes of the square and round inserts shown in FIGS. 11-13. In one example, the insert is round and contacts each side of the square composite structure in which it rests, or is a single square insert contacting the internal wall of the structure at the midpoints of the walls. In FIG. 11, the insert is a plurality of inserts that fill the interior of the hollow structure, and are preferably bonded to the adjacent surfaces of the hollow structure and of the adjacent inserts.

Figure 12:
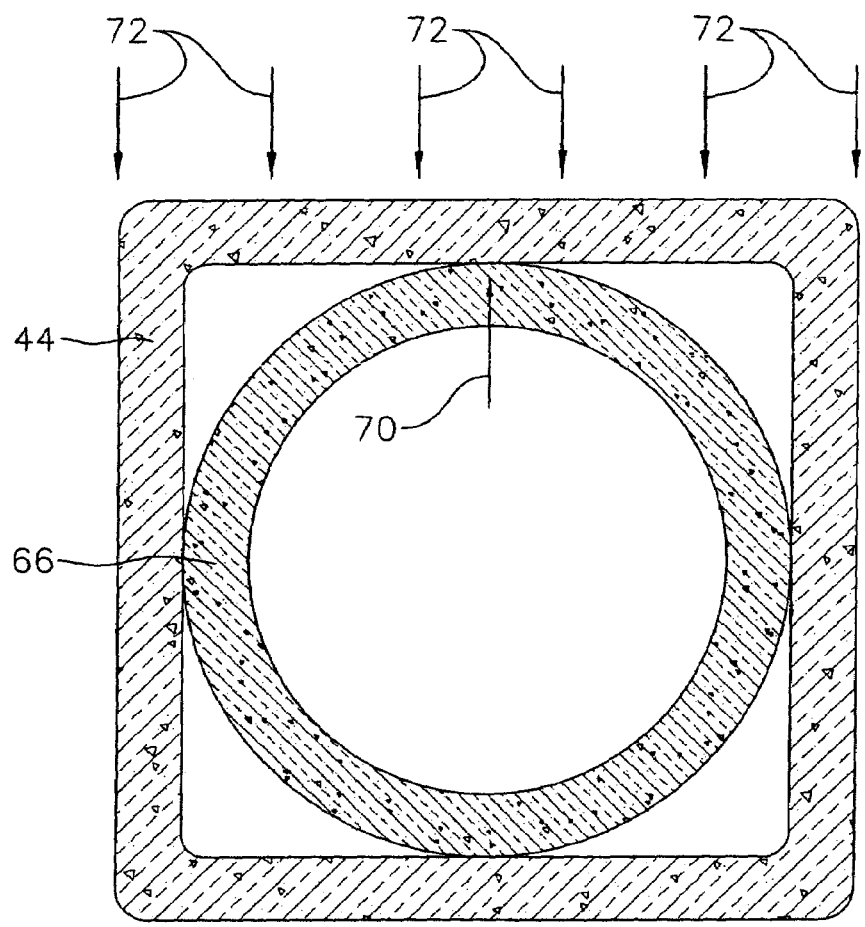
FIG. 12 is a transverse cross-section of a hollow device support similar to that of FIG. 11 having a circular internal support structure.
Figure 13:
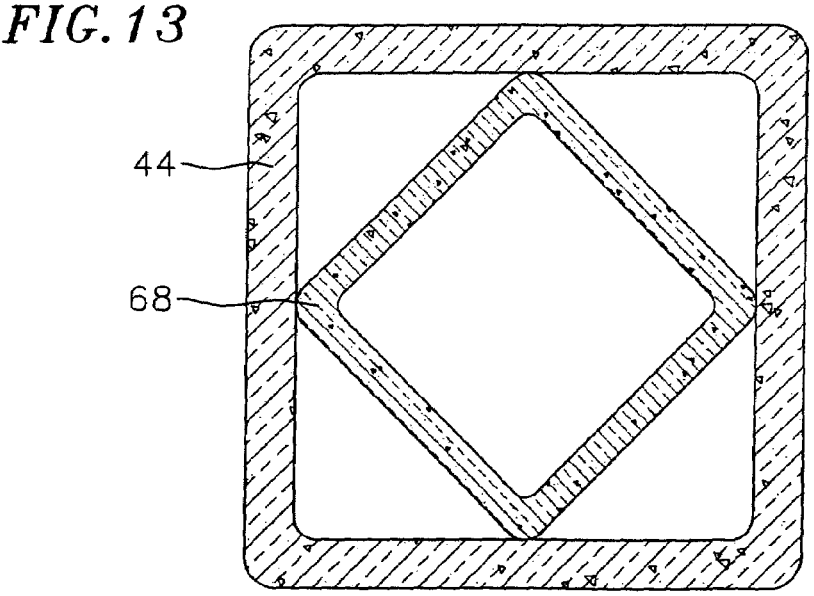
FIG. 13 is a transverse cross-section of a hollow device support similar to that of FIG. 11 having a single square internal support structure.

In one example of a hollow composite structure having supporting inserts, the composite column 44 includes any internal wall 64 defining a hollow interior of the composite column 44. The composite column is preferably hollow over the entire length of the column, and the wall of the column is preferably uniform in thickness so that the cross-sectional shape of the hollow portion is substantially the same as the outer shape of the composite column. In the example shown in FIGS. 4-6, a second structure contacts an inside surface of the composite column to provide additional load bearing support to the composite column. As depicted in FIGS. 12 and 13, the second structures 66 and 68, respectively, contact the inside surfaces of the adjacent composite column 44 at each of four relatively small areas approximately midway between each of the corners of the composite column. The second structures 66 and 68 provide additional support to the composite column in the direction of arrow 70 (FIG. 12) generally normal to the adjacent surface of the composite column, to help absorb, distribute or withstand loading that may be applied to the composite column. In the example depicted in FIG. 12, the support from the direction 70 helps to counteract the effects of loads 72 applied to the adjacent wall of the composite column. In the example of the drill column shown in FIGS. 1-6, the loading depicted by arrows 72 may come from the rollers 42 in the carriage 30. Additionally, where the second structures 66 and 68 are bonded with epoxy or other bonding agent (not shown) to the interior walls of the composite column, the second structures can also help to resist loading from other directions.

The composite column 44 preferably includes a plurality of second support structures, such as four hollow inserts 74 bonded to each other and to the inside adjacent surfaces 64 of the composite column 44 through epoxy 76 (FIGS. 4 and 6, not shown in FIG. 5) or another suitable bonding agent. The assembly is depicted schematically in FIG. 11, the four square hollow inserts 74 contacting the adjacent surfaces 64 of the composite column and the corresponding adjacent walls of the adjacent inserts through a bonding agent (not shown) such as epoxy. With this configuration, almost all of the inside surface 64 of the composite column is contacted by surfaces of the inserts through the epoxy.

In the configuration of the composite column and the inserts shown in FIG. 11, the inserts help to counteract loading 72. Counter forces are provided through the inserts 74 as represented schematically by the arrows 78 through the sides of the inserts contacting the adjacent wall 64 of the composite column. As shown in FIG. 11, the support provided by the plurality of square inserts 74 is somewhat different in character to that provided by the inserts 66 and 68, depicted in FIGS. 12 and 13, and the use of the plurality of square inserts may be preferred for larger interior components.

In the example of FIGS. 4-6, each insert 74 is preferably a hollow square tube formed as a composite of carbon fibers in a matrix similar to that used in the makeup of the composite column 44. The glass fiber layer can be omitted from the inserts, but each insert is preferably bonded to each of the adjacent structures through epoxy. The carbon fibers are wound and oriented in a manner selected according to the loads to be expected in the respective insert and the column. The composite column is approximately 4×4 inches square, and each tubular insert 74 is slightly less than one inch square so that four tubular inserts can fit within the hollow interior of the composite column.

As depicted in FIGS. 11-13, the sizes, shapes and configurations of the inserts can vary. The selection of the insert may depend on a number of factors, including the amount, concentration, direction or orientation of the loading to be expected. The selection of the inserts also depends on the internal configuration of the outer structure, which is square in the example of FIGS. 4-6. The shapes can be the same or different, the materials can be the same or different or the may have only a few common materials such as both having carbon fibers, the thicknesses can be the same or different, and the inserts can be positioned within the surrounding structure in a number of ways. However, the example of the drill column uses a square composite column with four square inserts bonded within the hollow area of the column. The inserts preferably extend the length of the column not occupied by the top end plate 50, tube mount 80 or mounting bracket 90.

Figure 8:
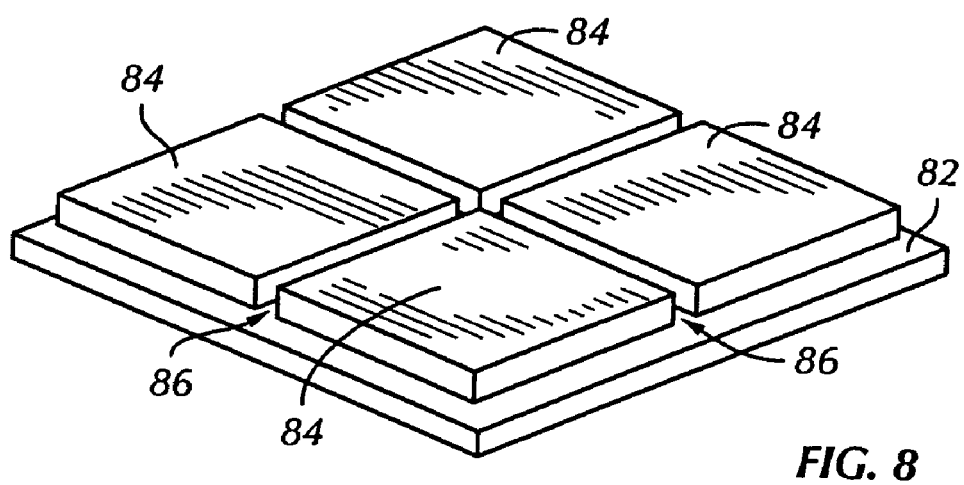
FIG. 8 is an upper isometric view of a lower support plate for used with the drill column of FIG. 1.

The inserts are supported within the composite column by an inner tube mount 80 in a lower end portion of the drill column. The tube mount 80 may take the form of a support plate 82 dimensioned to conform to the interior hollow portion of the composite column and includes a plurality of bosses or posts 84 (FIG. 8). Each post preferably conforms to the interior configuration of a respective insert so that the insert can extend around the respective post 84 and rest on the support plate 82. Each of the four inserts 74 extend around a respective post 84, and adjacent walls of the inserts fit in channels 86 formed between adjacent posts. Epoxy may be used between the tube mount 80 and the inserts as well as between the tube mount 80 and the composite column 44.

The bottom surface of the tube mount 80 includes a boss 88. The boss 88 conforms to the shape of a mounting bracket 90, and extends from the bottom surface of the tube mount 80 in board from the outer edges of the tube mount so that the tube mount rests on the mounting bracket 90. The tube mount is preferably formed from a suitable stainless-steel.

Figure 9:
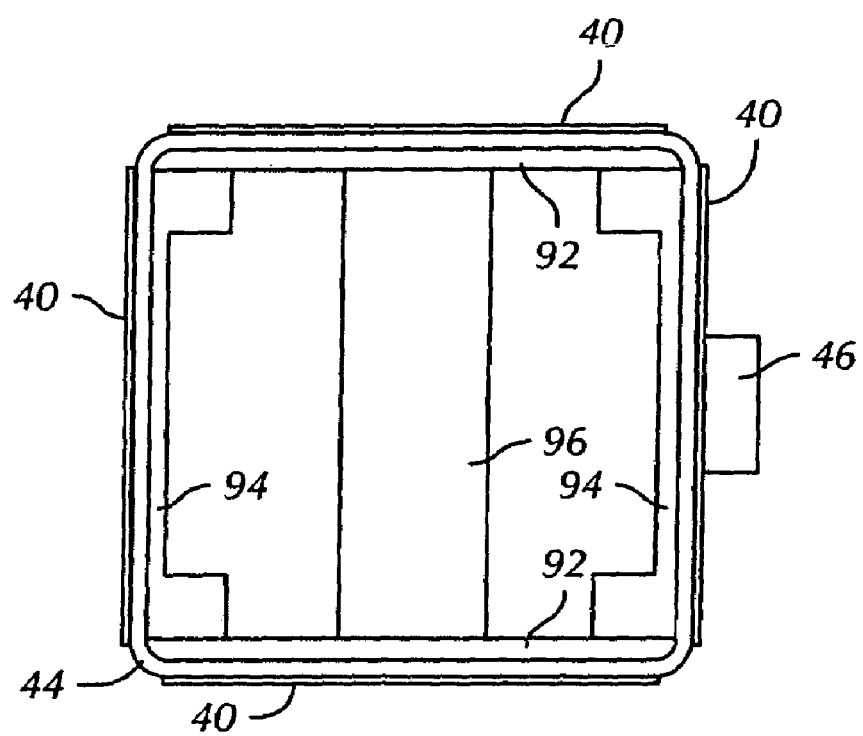
FIG. 9 is a bottom plan view of the drill column of FIG. 1.

The mounting bracket 90 (FIGS. 5 and 9) is assembled from two side plates 92 and two side walls 94 into an approximately square bracket conforming to the inside dimensions of the hollow composite column 44. The side plates and side walls are fastened together with appropriate fasteners to support a pair of spacers 96, which receive bolts 28 to mount the column to the base 22 (FIG. 1). The mounting bracket 90 is positioned against the tube mount 80 and inside the composite column with the epoxy joining the mounting bracket to the tube mount and to the composite column. The bolts 28 pass through the bracket 26, and through the steel plates 40 and epoxy layers 62, and then through holes formed in the composite column. The bolts 28 then pass through the mounting bracket 90 and through the other side.

The mounting bracket 90 can also be formed from cast aluminum or other materials. The height of the mounting bracket 90 from the bottom of the composite column 44 may be varied, depending on the overall length of the column 24. For drill columns, common overall drill column lengths may be 42 inches or less, 60 inches, 72 inches or 80 inches, or more.

The metal parts such as the mounting bracket 90, the inner tube mount 80 and the top end plate 50 are preferably prepared so as to easily complement the surrounding surfaces and structures. The parts are preferably surface ground and formed from a suitable material, such as stainless-steel, or in the example of the mounting bracket 90 aluminum or other material. A braking mechanism can also be included that applies a linearly extended forced to the column to maintain the carriage in place, to replace conventional point braking mechanisms.

The composite column with the inserts, for example composite insert tubes, provide a lightweight and low-cost structure for supporting a drill or other tool. The assembly provides a strong structure. The column can be formed from one material and the inserts formed from another material or from the same material. Additionally, the column can take a number of shapes, including square, rectangular, hexagonal, octagonal as well as other shapes. Additionally, the shape of the column may depend on the expected loading forces to be experienced on the structure. For example, the loading forces from the carriage 30 may be different with two rollers on each side compared to four rollers on each side as described above, and the configuration of the reinforcing zones provided by inserts may also be influenced by the loading forces.

Figure 10:
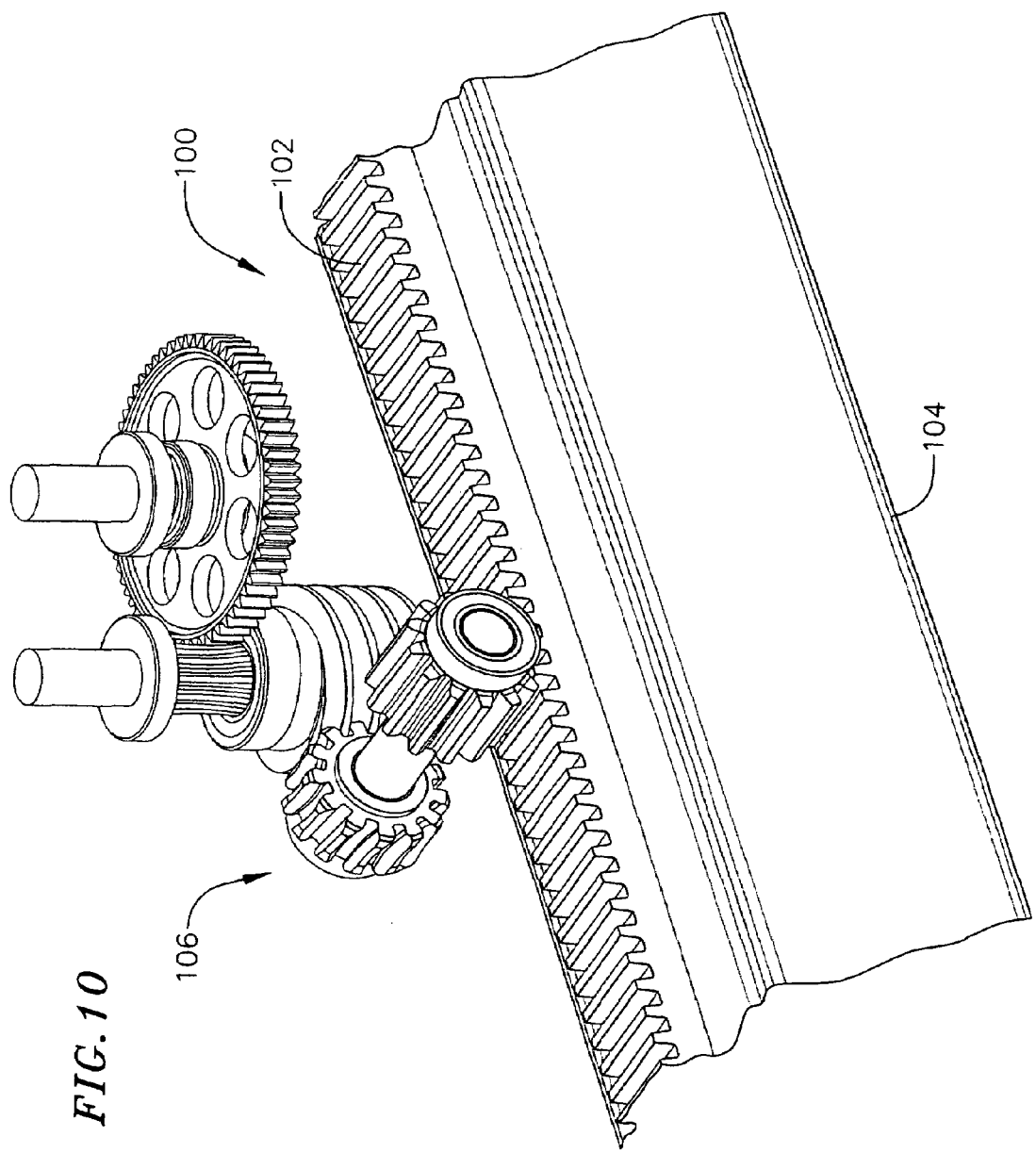
FIG. 10 is an upper side isometric view of a portion of a rail for use with a machining device and having a composite structure.

Another example of a component used in equipment for operating on work pieces includes tracks or rails such as that shown in FIG. 10. A track 100 includes a rack 102 bonded to a square carbon fiber composite hollow tube 104, comprised of resin impregnated carbon fibers wound in layers at desired angles to withstand the expected loading on the track, and having approximately the same shape as the composite column 44 for the drill column. The track 100 is part of a wall saw (not shown) used for cutting concrete. One such saw is the model 360-2100S of Dimas USA, which travels on the track through engagement of drive gears 106 with the rack 102.

Wear plates (not shown) are mounted on the top, bottom and outer sides of the track to support rollers of the wall saw. The wear plates are preferably steel and bonded through epoxy to the sides of the track. The wear plates preferably extend the entire length of the track and extend width-wise sufficiently to support the rollers and distribute the load applied by the rollers of the wall saw. The track may also include one or more layers of glass fiber composite between the carbon fiber and the epoxy.

The track also includes a support material within the square hollow tube 104. The support material may be a closed cell foam, a honey comb material or a support insert such as inserts 66, 68 or 74 configured and oriented such as shown in FIGS. 11-13. The inserts can take other shapes and can be oriented in other ways than those shown in FIGS. 11-13, but these shapes and orientations are shown by way of example. As with the drill column example, the insert can also be formed from the same material as the composite hollow tube 104, and can have the same shape. In one example, the track is slightly less than 2×2 in. square, and a single insert may suffice to provide the desired support for the track 104. If the support material is a foam, it may be a closed cell foam having a 0.0056 pounds per cubic inch density.

In another example of an extended composite element, such as one that may be used for a drill column or other longitudinal load bearing member, a column 240 (FIGS. 14 and 20) includes an inner element such as a core element 242 extending longitudinally and a fiber composite material 244 about the core element, also extending longitudinally. The fiber composite material in this example extends the same length as the core element 242. Also in this example, the fiber composite material includes fibers wound about the core element as pre-impregnated fibers and then cured, and the fiber composite material includes a plurality of fibers oriented in a desired fashion to withstand the expected loading that may occur on the column. The fiber orientation may be the same or similar to that described previously, or may have another configuration designed to withstand the expected loading on the column.

A second material in the form of an outer element 246 extends over at least a portion of the composite material 244. The second material is different from the composite material. For example, the second material may be an extruded aluminum element, as noted below. The outer element 246 may include bearing surfaces, wear surfaces or other surfaces for contact by other components. These surfaces may be formed integral with the outer element 246, may be fastened or adhered to the second element 246 or otherwise applied to the outer element. The plates 40 are one such surface, and other surfaces such as wear plates will be described more fully below. In the context of a drill column, the plates 40, and wear plates provide means for supporting a carriage such as the carriage 30 (FIG. 1) for movement along the drill column 240. Other elements such as films, foils, sheets or other material configurations may also provide means for supporting the carriage, where such films, foils, sheets or other configurations are used as support surfaces for rollers or other transport means in the carriage.

Figure 14:
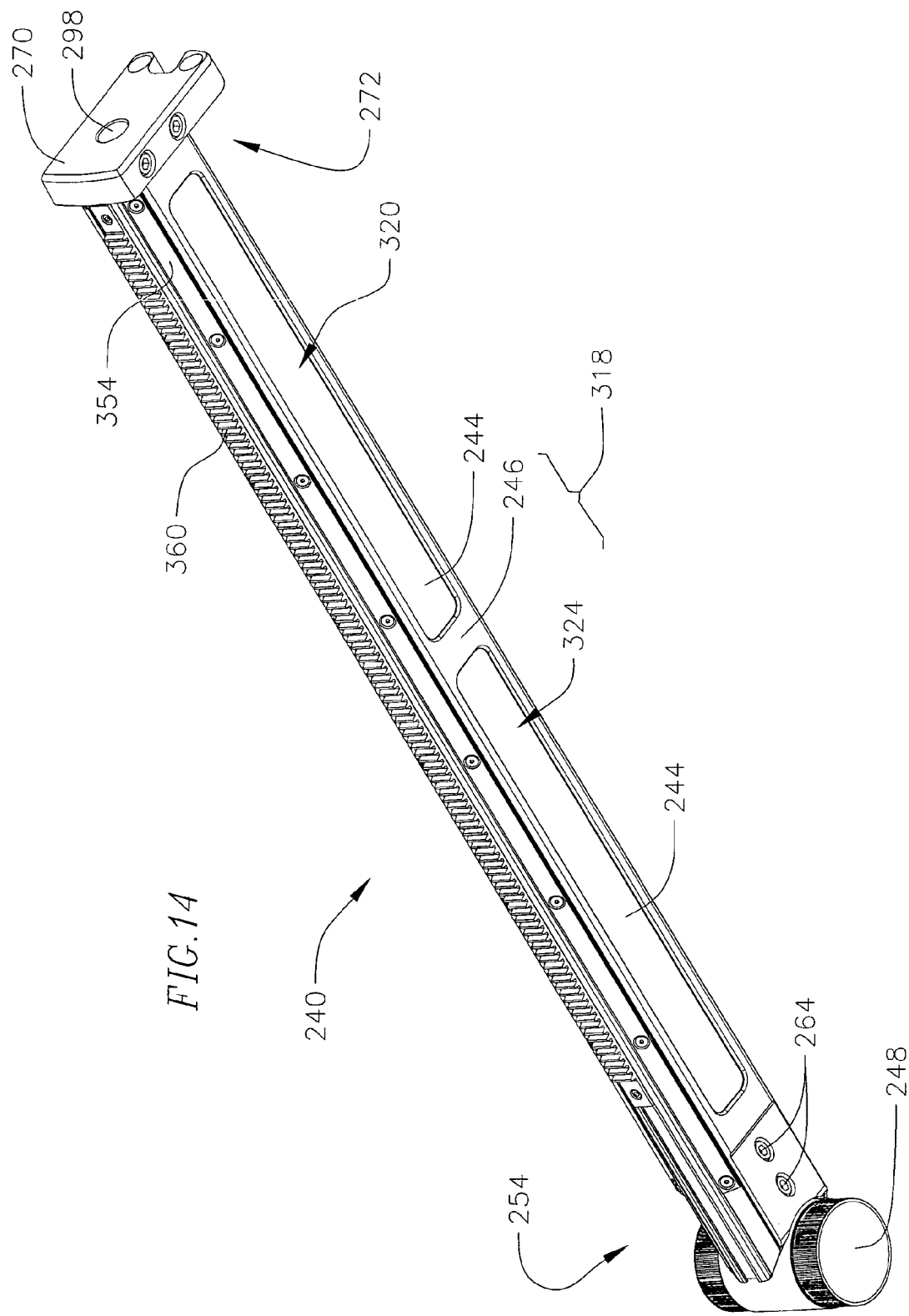
FIG. 14 is an isometric view of another example of a drill column assembly.
Figure 15:
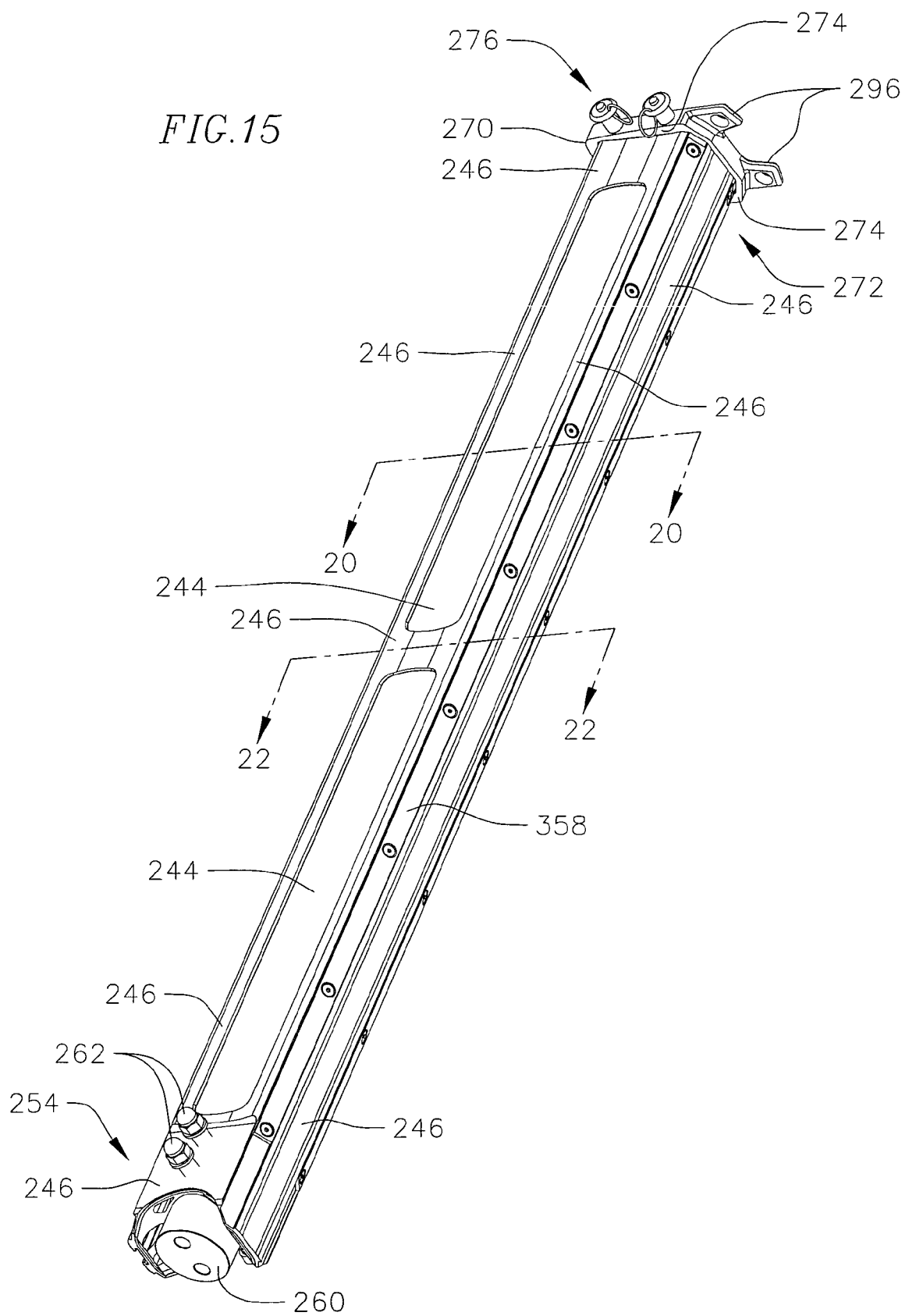
FIG. 15 is a lower isometric view of the drill column shown in FIG. 14 showing means for coupling the drill column to a hub.
Figure 16:
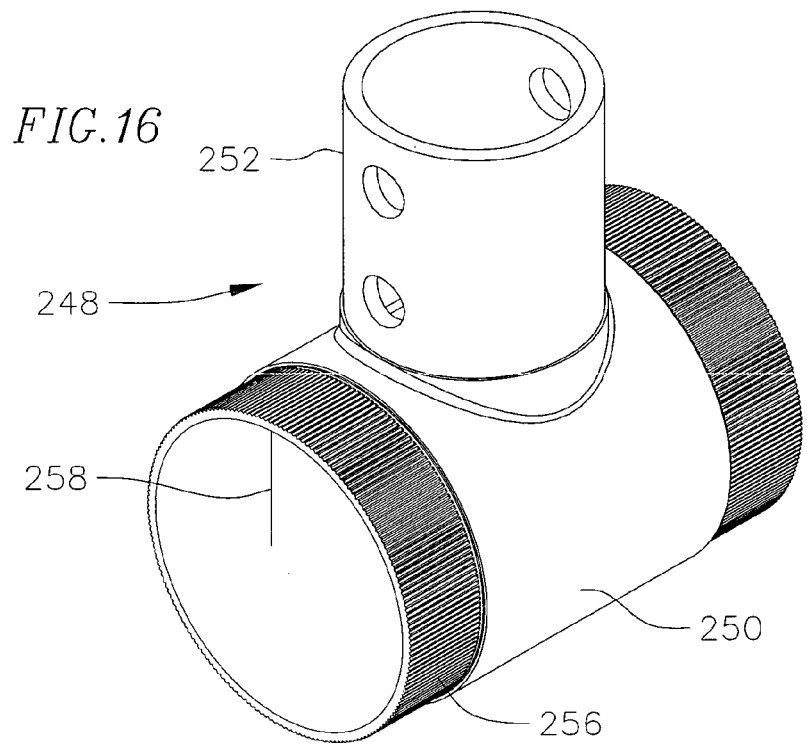
FIG. 16 is an isometric view of a hub for securing a drill column to a base.
Figure 16A:
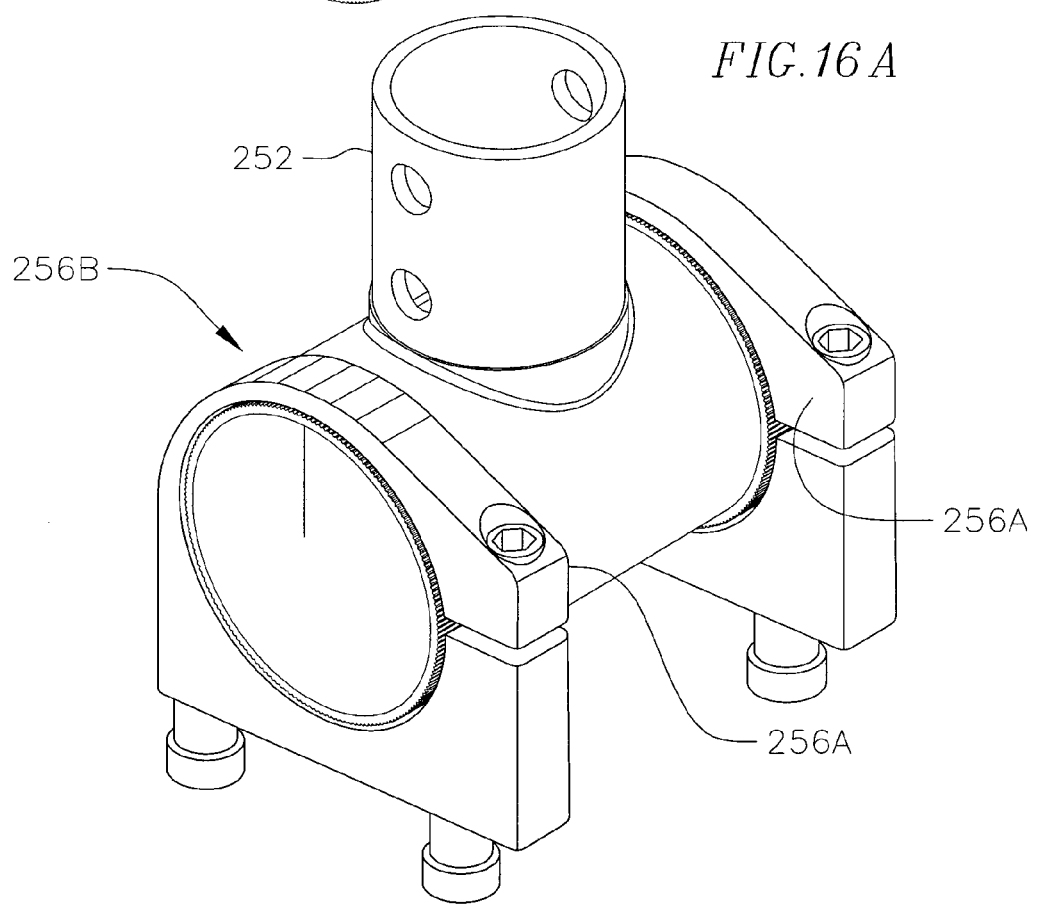
FIG. 16A is an isometric view of a hub and mounting arrangement for the hub.

Considering the drill column example in more detail with respect to FIG. 14, the drill column 240 is supported on a base (such as base 22 shown in FIG. 1) through a hub 248 (FIGS. 14 and 16). The hub includes two right circular cylindrical elements for supporting the column on a base. The two cylinders form substantially a T, having a base cylinder 250 configured to be supported on a complementary support structure on a drill assembly base, and a coupling cylinder 252 configured to couple to and securely engage a bottom portion 254 of the drill column 240. The base cylinder includes engagement elements or engagement surfaces in the form of ridges 256. The ridges on each side of the coupling cylinder 252 are engaged by respective pairs of brass jaw faces on the inside of hold down elements 256A mounted to the base to hold the drill column in position. Typical drilling arrangements will have the drill column precisely vertical relative to the base, but the hub 248 can be pivoted about an axis through the base cylinder 250 allowing the drill column to extend at a number of angles relative to the base. The angular position of the drill column may be indicated according to an index 256B on the base through a pointer or position indicator 258 (FIG. 16). Alternatively, the drill column may be mounted on a square, rectangular or other shaped mounting element through a cylindrical coupling element such as cylinder 260 (FIG. 15). The drill column 240 is secured to the hub or other element for coupling the drill column to a base or other support structure by a pair of bolts and cap nuts 262 (FIG. 15). The bolts 262 extend transversely of the drill column can extend across the narrower dimension of the drill column, as viewed in FIG. 20. The bolts extend through openings 264 in the drill column (FIGS. 14 and 20), and they are preferably centered on the sides of the drill column between the front 266 and the back 268. Other apparatus or methods may be used to fix the drill column in its desired location during operation.

A cover element in the form of a cover or cap 270 (FIGS. 14, 15 and 17) covers and closes the top end 272 of the drill column. The cap 270 covers the end of the drill column and includes a perimeter portion 274 extending outward of the outer perimeter of the drill column. The perimeter portion 274 is sufficiently substantial to block the carriage 30 from sliding off the drill column when the cap 270 is secured in place. In the example shown in FIGS. 14 and 15, the perimeter portion 274 extends outward of the drill column substantially the entire way around perimeter of the cap. Alternatively, the cap may have a perimeter portion that extends outward of the drill column for less than all of the perimeter of the cap. In such a situation, the perimeter portion 274 includes at least one segment having an outside dimension that is substantially greater than the outside dimension of the column at the same location on the column.

The cap 270 is releasably secured to the drill column by releasable securement or holding element in the form of releasable pins 276. The pins 276 allow the cap to be secured to the drill column during normal operation, but also permits easy removal of the cap for installation and removal of the carriage over the drill column. The pins 276 are preferably of the kind that allow removal of the pin with one hand. The use of a releasable pin makes easier the securement and removal of the cap. In the embodiment shown in FIGS. 17 and 19, the releasable pins include a push button 278 used to release the pin from engagement with the cap, and thereby release the pin from engagement with corresponding holes in the drill column. As shown in the schematic of FIG. 19, a releasable pin can be formed with a handle 280 supported by a shoulder 282, to which is mounted a securement cylinder 284 having sufficient strength to keep the cap from coming off the drill column under normal operating conditions when the pin is in place. The push button 278 pushes a rod 286 longitudinally of the cylinder 284 against the bias of a compression spring 288. The rod 286 includes depression is or other means (not shown) for allowing the detent balls 290 to retract sufficiently to allow the securement pin 276 to be removed. The detent balls 290 engage the walls of a counter bore 292 (FIG. 18) in the cap 270, thereby holding the securement pins in place in the cap until the push button 278 is depressed, releasing the securement pin.

When in place, the cap 270 covers and surrounds a perimeter portion of the top of the drill column. The drill column includes two pair of holes for receiving respective ones of the pins 276. The perimeter portion of the top of the drill column extends into the bottom of the cap in the area indicated by 294 (FIG. 17) and contacts the underside of the cap 270. Each securement pin 276 extends through one perimeter wall of the cap and then one hole in a side wall of the grow column. The pin passes through the cavity in the underside of the cap and through the other hole in the pair of holes in the drill column, and finally through a hole in the opposite perimeter portion of the cap. The detent balls 290 then engage a corresponding wall 292 in the cap. The securement pins reliably keep the cap in place on the drill column, while allowing easy removal of the cap for installation and removal of a carriage on the drill column. This securement pin can be easily removed with one hand.

The cap 270 also includes a pair of tabs 296 at respective portions of the perimeter wall of the cap. The tabs 296 permit easy attachment of turn buckles for an additional mechanism to secure the drill column. Each tab includes a respective opening for receiving a part of hardware. The tabs in the example shown in FIGS. 14 and 15 are placed on a side of the drill column opposite the rack, described more fully below. Other means may be provided for securing hardware, including rings, bars and the like.

The cap 270 includes a threaded opening 298 (FIGS. 14 and 18) for receiving a threaded jack screw such as jack screw 38 (FIG. 1). The cap 270 is formed from a material sufficiently strong to bear the weight and loading of a jack screw bearing against a wall or ceiling in opposition to the base of the drill assembly.

Figure 21:
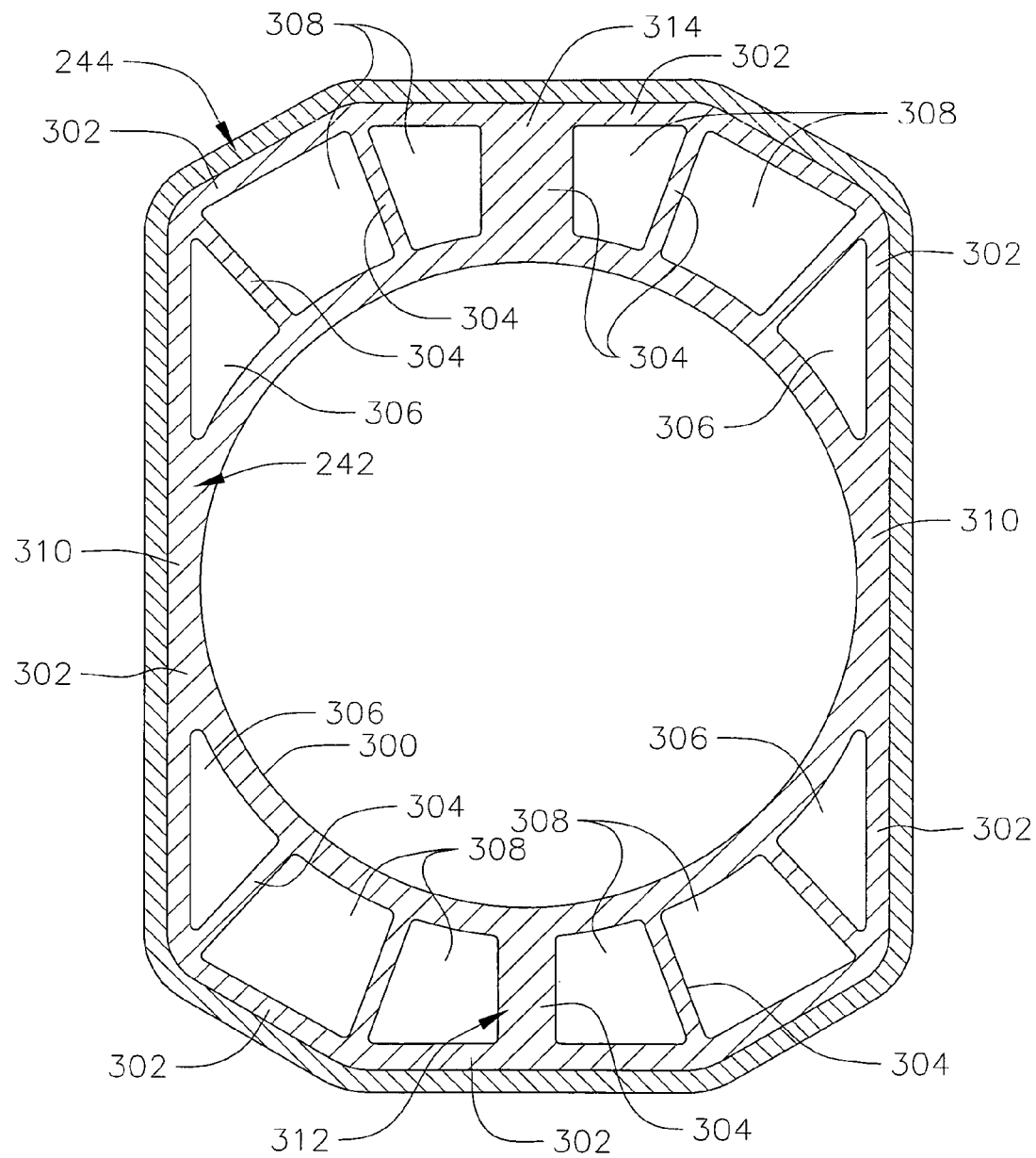
FIG. 21 is a transverse horizontal section of part of the drill column of FIG. 14.

Considering the example of the drill column in more detail in conjunction with FIGS. 20 and 21, the core element 242 forms an inner support for the drill column. The core element 242 in this example transmits the loading of the drill column to the hub and base. The inner core, and the composite layer 244, preferably have a constant transverse cross-sectional profile along the entire length of those respective elements. In the present example of the inner core, the inner core includes a circular interior portion 300, the base of which contacts and is supported by the coupling cylinder of the hub. In the configuration shown in FIG. 21, the circular interior portion 300 receives and concentrate's torsional and lateral or bending loading that might occur from the outside of the drill column. In this example, the circular interior portion 300 may be considered a load concentration zone. Other configurations are possible for concentrating loads from external forces to inner structures of the drill column.

The core element 242 in the present example also includes an outer wall 302 extending around the outer perimeter. The outer wall defines the cross-sectional area occupied by the core element, and also defines the footprint or envelope occupied by the core element. In the present example, the footprint and envelope of the core element are the same, but the term "footprint" will be defined by the area within the perimeter of the core element, whereas the term "envelope" will be defined by the area occupied by the core element as determined by a closed circuit of lines drawn between the outer-most points of the perimeter. Therefore, in an example of an inner core having grooves or inlets, the footprint will reflect the grooves or inlets and have a smaller defined cross-sectional area than the envelope of the same inner core. In the case of the envelope, the cross-sectional area would include the areas of the footprint represented by the grooves or inlets.

The outer wall 302 receives any external forces or loads applied and transmits those loads to the circular interior portion 300. The core element includes segments 304 between the outer wall 302 and the interior portion 300. In the example shown in FIGS. 20 and 21, the segments 304 transmit external loading to the circular interior portion 300. The segments can take a number of configurations. The configurations of the segments may be selected according to the expected loads, the desired weight of the final drill column, the desirability of having the inner core supporting other components, as well as other considerations. In the present configuration, the segments help to define substantially triangular voids 306, 10 they also help to define substantially trapezoidal voids 308. These voids help to reduce the weight of the inner core while still allowing the inner core to provide structural support to the drill column. As with the configuration of the segments, the number, shape and configuration of the voids may be selected according to the expected loading, the desired weight of the core element, and the like.

The core element also includes lateral or side segments 310 where the outer wall and the interior portion 300 are integral with each other. These side segments 310 are positioned substantially parallel to a significant amount of the loading that is experienced by the drill column. A back segment 312 is significantly thicker or heavier than the adjacent segments as the back segment 312 is also parallel to significant loads experienced by the drill column. A front segment 314 is also thicker than adjacent segments as well as being thicker than the back segment 312 for the additional loading experienced and also to accommodate shoulder screws for holding the rack in place. The core element can take a number of configurations and have a number of functions contribute to one or more of the benefits of the column, but it should be understood that the configurations can be modified or otherwise changed and functions can be changed while still achieving one or more benefits of the drill column examples described.

In the configuration of the core element shown in FIGS. 20 and 21, the outer wall 302 of the core element is formed as a series of connected straight lines. In this configuration, the envelope and the footprint are essentially identical, and the surface areas defined by the envelope and by the footprint are also essentially identical. Additionally, the outer profile of the core element is a geometric cylinder in that it is a closed shape having substantially straight longitudinally extending surfaces, up to the point where the core element meets the hub.

The drill column also includes a fiber composite material 244 (FIGS. 20 and 21) extending over at least a portion of the core element 242. In the present example, the composite material extends over substantially all of the outer longitudinally extending wall portions of the core element. Also in the present example, the composite material is substantially fixed to the outer surface of the core element by curing of the composite material to the core element. The configuration and methods of forming the composite material are substantially the same as those described previously, except as otherwise set forth herein. In the present example, the fibers are oriented carbon fibers wound around the core element as pre-impregnated fibers, after which the composite is cured according to known procedures. In the present example, three layers of fibers of 0.022 in. thick form a composite material layer approximately 0.060 inches thick, with the fibers in the first layer oriented at approximately 10 degrees to the central axis of the core element, the second layer at approximately 45 degrees, and the third layer at approximately 10 degrees to the central axis. The ratios of layers may be 1:1 of 10 degrees to 45 degrees with an even number of layers, but a 2:1 ratio of 10 degrees to 45 degrees is believed to provide additional longitudinal strength. Fibers closer to parallel with the central axis provide additional longitudinal strength, and the fiber orientation may be less than 10 degrees, while fiber orientation's greater than 10 degrees will also provide resistance to longitudinal loading. Orientations other than 45 degrees can also be used to resist torsional and side loading. As shown in FIGS. 20 and 21, the composite material follows the profile of the envelope of the inner core element 242.

The outer element 246 (FIG. 20) is formed so that it will extend over at least a part of the composite material. The outer element 246 can have a number of structures and functions that contribute to the strength, reliability, lifetime and other features of the column. It should be understood that one or more of the structures and functions can be omitted, changed or substituted while still achieving one or more of the benefits of the column.

The outer element 246 in the present example is configured to have an inside profile 316 (FIG. 22) at least part of which matches both the envelope and the footprint of the composite 244, as the envelope and the footprint are identical in this example. While the envelope and the footprint can be different, it is desirable, though not necessary, to have the outer element 246 contact as much of the surface area of the composite material envelope as possible. It is also desirable to have any areas of contact between the outer element 246 and the composite material 244 as close and as secure as possible, so the core element, the composite material and the outer element act as much like a single unit or monolithic structure as the particular configuration allows. Likewise, the inside profile 316 has at least one section that is substantially the same as or identical to the outside profile of the core element 242, because in this example, the composite material windings follow the profile of the core element. In the present example, the outer element 246 has three sections whose profiles are substantially the same as the profiles of the composite material 244. The first section corresponds to the top portion or top end 272, the second section corresponds to the bottom end portion 254 and the third section corresponds to an intermediate portion 318 (FIG. 14). In each of the sections, the outer element 246 extends completely around the composite material in a closed circuit. Between the first and third section, side openings 320 and 322 (FIGS. 14 and 20) are formed in the side walls of the outer element. Only side opening 320 is shown in FIG. 14, the other side opening 322 being on the opposite side of the drill column. Between the third and second sections, a side opening 324 (FIG. 14) is formed in the side wall of the outer element, and an additional side opening is formed on the opposite side of the outer element (not shown). Otherwise, the outer element 246 has the profile shown in FIGS. 20 and 22.

The outer element 246 has a first major side 326 (FIG. 22) and a second major side 328 extending in the plane of the drawing substantially parallel to a major axis 330. More loading occurs on the major axis 330 than occurs on the minor axis 332. A first minor side 334 extends substantially parallel to the minor axis 332, and a second minor side 336 extends substantially parallel to the minor axis. A first angled side 338 joins the first major side 326 and the second minor side 336, and a second angled side 340 joins the second major side 328 with the second minor side 336. A third angled side 342 joins the first major side 326 and the first minor side 334, and a fourth angled side 344 joins the second major side 328 with the first minor side 334. The angled sides receive loading from rollers on a carriage, which loading is transmitted to the core element 342 through the composite material and adjacent side portions of the outer element.

In the present example, the outer element is configured so that the inside profile 316 defines an envelope that has a smaller cross-sectional area then the envelope defined by the composite material. In the present example, the envelope for the inside surface profile 316 is defined by the dimensions between the surfaces along the major and minor axes 330 and 332 and the spacing between at least partly opposite pairs of angled walls, 338 and 344, and 340 and 342. One or more of these dimensions is about 0.001 inch smaller (plus or minus about 0.0005 inch) than the corresponding outer dimension for the composite material when both the outer element 246 and the composite material/core element are in their respective relaxed states, in other words prior to assembly. Therefore, in this example, the envelope defined by the inside profile 316 is smaller than the envelope defined by the outer perimeter of the composite material. When the outer element 246 is placed over the cured composite material, which composite material includes a layer of adhesive material, such as DP-420 from 3M, they are press fit together so that there is reliable contact and support between the outer element 246 and the adjacent surfaces of the composite material. The adhesive layer is applied to all exposed surfaces of the composite material before the outer element 246 is placed over the composite material. The adhesive layer is represented in FIG. 20 and 343, but the amount of adhesive remaining after assembly will be determined by the differential between the inner and outer envelopes. This under fit, or negative differential, between one or more inside dimensions of the outer element 246 and one or more outside dimensions of the composite material produce a tight fit between the outer element and the composite material, and contribute to the outer element, composite material and core element acting as a single unit or monolithic structure. The inner envelope of the outer element 246 and the outer envelope of the composite material in their respective relaxed states (sometimes referred to as the inner and outer envelopes) can also be substantially identical and still have a suitably functioning construction. Additionally, there may be a positive differential between the inner and outer envelopes can still have a functioning construction. For example, a positive differential between the inner and outer envelopes can be taken up by adhesive, foam, filler or other material. In other configurations, a negative differential can be created by varying the profiles producing the respective envelopes, varying their dimensions, or in other ways.

Figure 22:
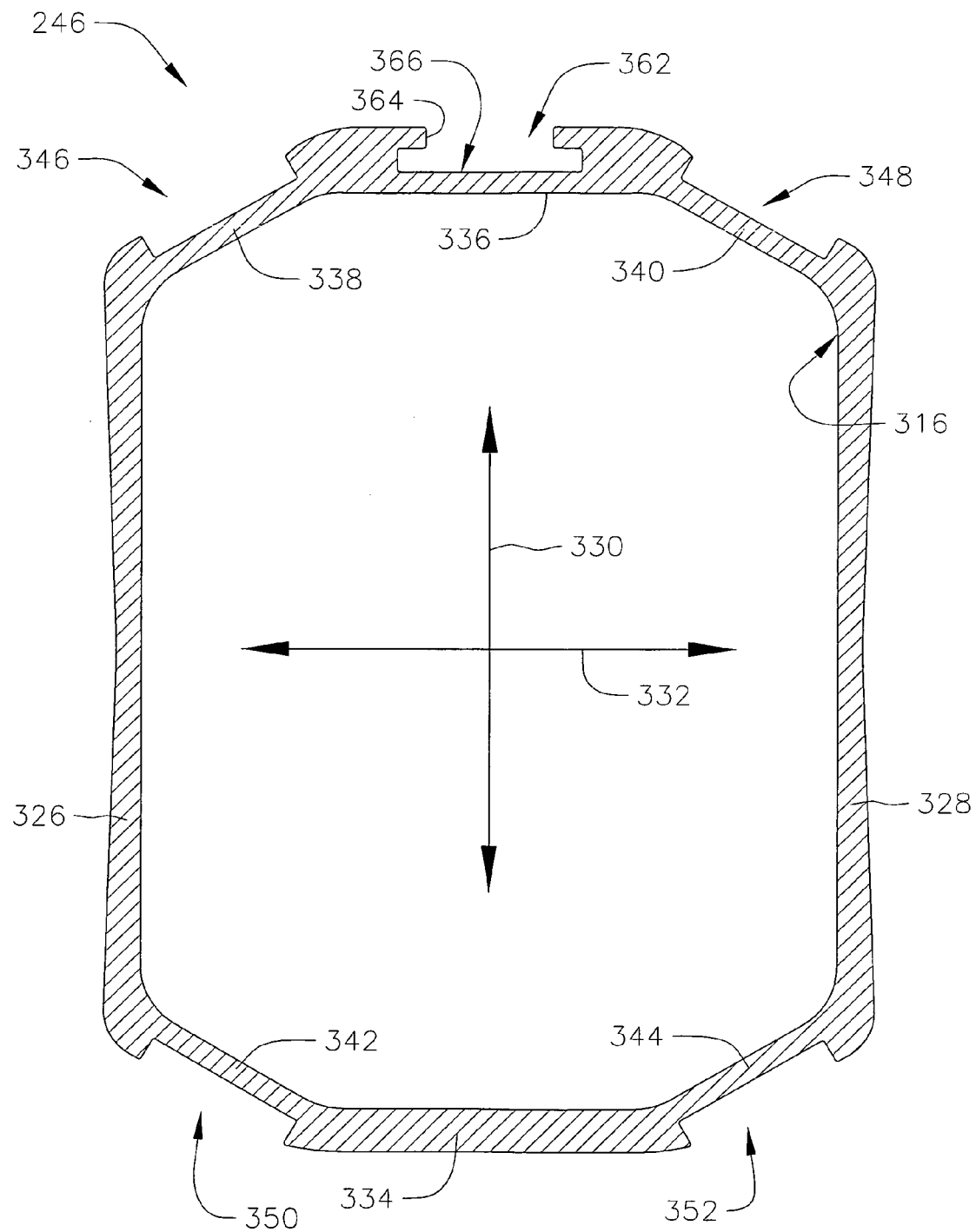
FIG. 22 is a transverse horizontal section of part of the drill column of FIG. 14.

The outer element 246 in the present example includes additional material for accommodating loading, wear and or other influences that might be experienced by the structure. As shown in FIGS. 20 and 22, the minor walls 334 and 336 have added material relative to the center portions of the major walls 326 and 328, and the major walls 326 and 328 have added material as those walls approach the adjacent angled walls. The added material helps to transmit loading applied to the outer element. The added material can be integral with the outer element or may be added separately, such as by fasteners, adhesive, bonding or otherwise. In the present example, the added material is incorporated in the extrusion used to create the outer element. The angled walls also include additional material to define respective grooves or channels 346, 348, 350 and 352 (FIG. 22) into which wear strips may be press fit. For example, wear strip 354 (FIG. 14) may be pressed into groove 346, wear strip 356 can be press fit into groove 348 (FIG. 20) and wear strip 358 (FIG. 15) can be press fit into groove 350. The press fit can be omitted but it is preferably a light press fit as the wear strips are held in place by suitable fasteners, in the present example 8 fasteners per wear strip. In the example shown in FIG. 22, the grooves formed in the outer element 246 have adjacent walls that are oriented at approximately 90 degrees relative to each other, and the press fit is provided by dimensional differences between the wear strip and the respective groove. Using fasteners and a light press fit allows the wear strips to be replaceable.

Figure 23:
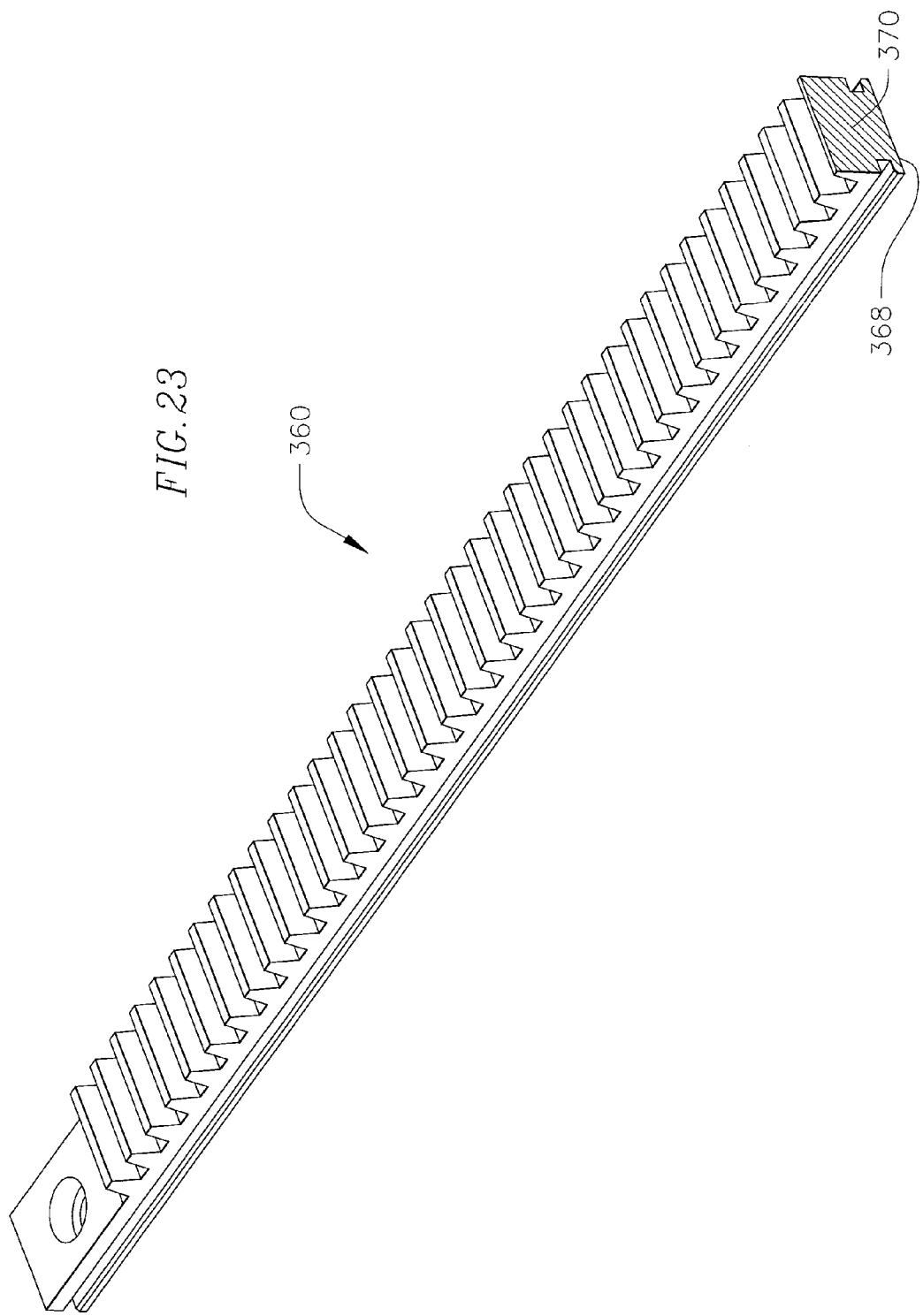
FIG. 23 is an isometric and partial cutaway of a rack for use with the drill column of FIG. 14.

The outer element 246 in the present example also includes additional material to help support a rack 360 (FIGS. 14, 20 and 23). The additional material also defines a rack groove 362 (FIG. 22) having a longitudinally extending opening 364 smaller than a longitudinally extending base portion 366. The rack groove 362 the present example is dimensioned relative to a base 368 (FIGS. 20 and 23) so as to provide a medium tight fit and to help capture and hold the rack in the groove once the rack is press fit into place. The base 368 supports the teeth on a rack through a reduced-width web 370 that conforms to the opening 364. A pair of rack fasteners 372 hold the rack in place. The rack fasteners are shoulder bolts having an approximately quarter inch shoulder terminating in approximately ⅜ inch of thread. The thread engage a threaded section in the back segment 314 of the core element. A fastener is placed at each end of the rack to hold the rack in place in conjunction with the press fit and the groove. The rack is also removable and replaceable as with the wear strips.

Other means may be provided on or in conjunction with the outer element to transmit loading, reduced wear, increase lifetime, or for other functions. For example, the outer element can be coated, plated or deposited with additional material, which material may be stronger, harder or softer as desired, to produce the desired effect. Such additional material may also be extruded with the outer element.

The wear strips (including 354, 356 and 358) in the present example are rectangular bars having a width sufficient to allow press fitting into the respective groove and a height in the groove sufficient to minimize the possibility that an element of the carriage might contact any portion of the outer element 240 other than the wear strips and the rack 360. (It is understood that the carriage is configured differently from that shown in FIGS. 1 and 2, so that rollers or other support surfaces in the carriage ride on the wear strips.) Each wear strip is held in place in the present example with eight fasteners threaded into respective helicoil inserts passing through openings formed or machined into the outer element, and formed in the composite material and the core element. Each fastener is preferably a socket counter sunk head screw threaded into the helicoil insert. The heads of the fasteners are preferably recessed below the exposed surface of the corresponding wear strip. In FIG. 20, the head screw is shown at 374, and helicoil inserts are shown at 376. The helicoil inserts are threaded into tapped openings in the angled walls of the core element. The openings are threaded so that the helicoil inserts can be threaded into the material of the core element. The wear strips can also be applied through adhesive, bonding or other means of attachment. However, having an outer core formed from a material different from a composite allows the wear strips, rack and or other components to the replaceable, helps to protect the composite material from wear and the effects of UV radiation, and the like.

FIG. 20 shows various elements of the wear strip and fastener assemblies removed for purposes of clarity. The wear strip 354 and one fastener and helicoil insert assembly are shown complete, whereas the wear strip 356 on the other side of the rack is shown with the fastener and helicoil assembly removed. The bores formed in the outer element 246 the composite 244 and the core element 242 are shown under the wear strip 356. The fastener 374 and its helicoil insert 376 are shown without the corresponding wear strip in FIG. 20. This portion of the Figure shows the rim of the helicoil insert resting in a counter bore formed in the groove for the wear strip. A counter bore 390 is shown in the adjacent wear strip groove, which has the wear strip and the fastener and helicoil assembly omitted. It should be understood, however, that in the final assembly, all four wear strips IS and their associated sets of eight fastener and helicoil assemblies will be in place. It should also be understood that the wear strips and fastener assemblies or other means for mounting the wear strips can be placed in other configurations, such as on the major and/or minor sides or in other configurations as a function of the column profile.

Each set of fasteners and helicoil assemblies extend into the column elements at angles with respect to the adjacent minor sides. In the present example, the angles are determined by the angles at which the respective angled sides bear to the adjacent minor sides, and angles of the angled sides may be between 20 and 40 degrees and may be between 30 and 36 degrees. In the present example, the angled sides are about 30 degrees from the minor side.

The fastener and helicoil insert assemblies help to place the composite material under compression. The composite material is placed under compression between the screw heads, the wear strips, the outer element material and the underlying core element 242. Placing the composite material under compression helps to maintain the integrity of the assembly, and also helps the composite material to respond effectively under loads.

The inner, core element and the outer element in the present example are extruded profiles of 6061 aluminum, the wear strips are titanium, stainless-steel or zinc plated steel, and the rack is steel. Other materials may be used as desired, and the selection of the materials may be determined by the expected loading for the assembly, the materials used for other components, and the like. Other inner materials may be composites as with the earlier examples of a column, or other metals, plastics or honeycombs, and the like. The composite material may also be formed as described in the other examples herein, or may be formed with other materials, fiber compositions, other fiber layups, orientations, and the like. The composite material is under compression during the expected loading, and the loading is transmitted at least in part to the inner core element, which has a cylindrical shape. Parts of the composite material are also under compression between the core element and the outer element. This latter compression may occur through the fasteners and also may occur through a negative differential between the inner and outer envelopes. The negative differential may be approximately 0.001 inch gap between the inner and outer envelopes, which also might be termed a negative gap. This negative gap in the present example occurs over a substantial longitudinal length of the column.

The assembly is produced by extruding the inner core element and also extruding the outer element to have the desired profiles. The core element is wound with carbon or other fibers with a curing material in the desired number of layers and orientations. The composite material is secured and adhesive applied to the outside of the composite material. The outer element is machined to form the openings such as 320 and 324, and to remove imperfections that may damage the composite material during assembly. The outer element is then placed over the composite/inner core combination, such as by pressing where there is a negative differential or negative gap (or zero differential or gap) between the inner and outer envelopes, or otherwise inserting the composite/inner core combination within the outer element. The assemblies then machined at both ends, if necessary, to accommodate the cap and any mounting hardware such as the hub to be used with the assembly. The wear strips and rack are press fit into place and fastened with their respective fasteners to the inner core. In an alternative approach, for assembling the outer element, composite material and core element, the composite material may be wound on a fluid bladder, reduced in diameter and inserted in the outer element, inflated and cured. The core element is then coated with adhesive and inserted into the composite material after the bladder is removed.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A drill column comprising:
   a core element extending longitudinally;
   a fiber composite material extending over at least a portion of the core element;
   a second material extending over at least a portion of the composite material wherein the second material is different from the composite material; and
   means on the second material for supporting a carriage for movement along the drill column.

2. The drill column of claim 1 wherein the fiber composite includes oriented fibers.

3. The drill column of claim 1 wherein the core element is formed from a metal.

4. The drill column of claim 1 wherein at least a portion of the composite material is under compression between the core and the second material.

5. The drill column of claim 1 wherein the core element has a cylindrical shape and wherein at least a portion of the second material has a cylindrical shape.

6. The drill column of claim 5 wherein the composite material is under compression between the core element and the second material.

7. The drill column of claim 6 wherein the core element in a relaxed state separated from the second material has a different outside dimension than an inside dimension of the second material in a relaxed state separated from the core element.

8. The drill column of claim 6 wherein the core element and the second material extend longitudinally, and wherein, at a given longitudinal position on the core element, the core element has a relaxed state separate from the second material and an outside dimension in the relaxed state, the second material has a relaxed state separate from the core element and an inside dimension in the relaxed state, and wherein the outside dimension is greater than the inside dimension at the given longitudinal position.

9. The drill column of claim 8 wherein the outside dimension is approximately 0.001 in. larger than the inside dimension.

10. The drill column of claim 8 wherein the outside dimension is greater than the inside dimension over a substantial longitudinal distance of the core element.

11. The drill column of claim 6 wherein the core element and the second material are fastened together.

12. The drill column of claim 11 wherein a fastener compresses the composite material.

13. The drill column of claim 1 wherein the second material forms an outer element extending over at least part of the composite material and wherein the drill column further includes a wear plate on an outside surface of the outer element.

14. The drill column of claim 13 wherein the wear plate is fastened to the drill column by a fastener engaging the core element.

15. The drill column of claim 13 further including a rack on outside surface of the outer element.

16. The drill column of claim 13 wherein the wear plate is positioned in a groove on the outer element.

17. The drill column of claim 16 wherein the groove is configured to frictionally engage the wear plate.

18. The drill column of claim 1 wherein the second material forms an outer element having at least first and second sides facing in different directions at a substantial angle relative to each other and wherein the first and second sides are joined by a third side facing a direction different than the first and second sides and wherein the drill column further includes a wear strip on the third side.

19. The drill column of claim 18 wherein the wear strip is positioned in a groove on the third side.

20. A drill column comprising:
    a cylindrical column extending longitudinally from a base to a top portion;
    a rack extending along a longitudinally extending surface of the cylindrical column;
    a cap over the top portion of the cylindrical column;
    a releasable securement securing the cap to the column wherein the securement can be released and removed using one hand;
    a carriage supported by the cylindrical column wherein the carriage does not fit past the cap when the cap is in place on the cylindrical column; and
    wherein the releasable securement includes a spring biased release element for allowing the securement to be removed from the column.

21. The drill column of claim 20 wherein the releasable securement includes a pin.

22. A drill column comprising:
    a cylindrical column extending longitudinally from a base to a top portion;
    a rack extending along a longitudinally extending surface of the cylindrical column;
    a cap over the top portion of the cylindrical column;
    a releasable securement securing the cap to the column wherein the securement can be released and removed using one hand; and
    wherein the cap further includes means for mounting hardware to the cap.

23. The drill column of claim 22 wherein the mounting means includes a wall defining a fully enclosed opening.

24. The drill column of claim 23 wherein the opening is sized to accept a turnbuckle.

25. A drill column comprising:
a cylindrical column extending longitudinally from a base to a top portion;
a rack extending along a surface extending longitudinally of the cylindrical column;
a cap over the top portion of the cylindrical column; and
a releasable holding element for holding the cap on the top portion of the cylindrical column wherein the holding element includes an apparatus actuated by pressing wherein pressing the apparatus releases an engagement between the holding element and the cylindrical column so that the holding element can be removed from the cylindrical column.

26. The drill column of claim 25 wherein the releasable holding element includes a biased detent that is released by pressing the apparatus.

27. The drill column of claim 26 wherein the apparatus is biased through a spring.

28. The drill column of claim 25 wherein the releasable holding element includes a pin.

29. A longitudinally extending column comprising:
a core element extending longitudinally;
a composite material extending over at least a portion of the core element and including oriented fibers;
a second material extending over at least a portion of the composite material wherein the second material is different from the composite material.

30. The column of claim 29 wherein at least one of the core element and the second material is a metal.

31. The column of claim 29 wherein the core element is formed from a metal and wherein the second material is formed from a metal.

32. The column of claim 29 wherein at least a portion of the composite material is under compression.

33. The column of claim 29 wherein the core element has a cylindrical shape and wherein the second material has a cylindrical shape.

34. The column of claim 33 wherein the composite material is under compression between the core element and the second material.

35. The column of claim 34 wherein the core element in a relaxed state has a different outside dimension than an inside dimension of the second material in a relaxed state.

36. The column of claim 34 wherein the core element and the second material extend longitudinally, and wherein, at a given longitudinal position on the core element, the core element has a relaxed state and an outside dimension in the relaxed state, the second material has a relaxed state and an inside dimension in the relaxed state, and wherein the outside dimension is greater than the inside dimension at the given longitudinal position.

37. The column of claim 36 wherein the outside dimension is approximately 0.001 in. larger than the inside dimension.

38. The column of claim 36 wherein the outside dimension is greater than the inside dimension over a substantial longitudinal distance of the core element.

39. The column of claim 34 wherein the core element and the second material are fastened together.

40. The column of claim 39 wherein a fastener compresses the composite material.

41. The column of claim 29 wherein the second material forms an outer core extending over at least part of the composite material and wherein the column further includes a wear plate on an outside surface of the outer core.

42. The column of claim 41 wherein the wear plate is fastened to the column by a fastener engaging the core element.

43. The column of claim 41 further including a rack on outside surface of the outer core.

44. The column of claim 41 wherein the wear plate is positioned in a groove on the outer core.

45. The column of claim 44 wherein the groove is configured to frictionally engage the wear plate.

46. The column of claim 29 wherein the second material forms an outer core having at least first and second sides facing in different directions at a substantial angle relative to each other and wherein the first and second sides are joined by a third side facing a direction different than the first and second sides and wherein the column further includes a wear strip on the third side.

47. The column of claim 46 wherein the wear strip is positioned in a groove on the third side.

* * * * *